(12) United States Patent
Bassett

(10) Patent No.: US 9,668,398 B2
(45) Date of Patent: Jun. 6, 2017

(54) AGRICULTURAL SYSTEM FOR FIELD PREPARATION

(71) Applicant: Dawn Equipment Company, Sycamore, IL (US)

(72) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 0 days.

(21) Appl. No.: 14/975,852

(22) Filed: Dec. 20, 2015

(65) Prior Publication Data
US 2016/0100520 A1    Apr. 14, 2016

Related U.S. Application Data

(63) Continuation-in-part of application No. 14/172,905, filed on Feb. 5, 2014, now Pat. No. 9,241,438.

(51) Int. Cl.
| | | |
|---|---|---|
| *A01B 49/06* | (2006.01) | |
| *A01B 49/02* | (2006.01) | |
| *A01B 39/08* | (2006.01) | |
| *A01B 29/04* | (2006.01) | |
| *A01B 29/06* | (2006.01) | |
| *A01B 39/22* | (2006.01) | |

(Continued)

(52) U.S. Cl.
CPC ............ *A01B 49/027* (2013.01); *A01B 29/04* (2013.01); *A01B 29/06* (2013.01); *A01B 39/08* (2013.01); *A01B 39/22* (2013.01); *A01B 49/06* (2013.01); *A01B 61/046* (2013.01); *A01C 7/06* (2013.01); *A01D 34/8355* (2013.01); *Y02P 60/214* (2015.11)

(58) Field of Classification Search
CPC ........ A01B 39/08; A01B 49/027; A01B 49/06
USPC ................ 172/151, 154, 157, 158, 184, 187
See application file for complete search history.

(56) References Cited

U.S. PATENT DOCUMENTS

| | | |
|---|---|---|
| 114,002 A | 4/1871 | Godfrey |
| 321,906 A | 7/1885 | McCormick |

(Continued)

FOREIGN PATENT DOCUMENTS

| | | |
|---|---|---|
| BE | 551372 | 10/1956 |
| CA | 530673 | 9/1956 |

(Continued)

OTHER PUBLICATIONS

Case Corporation Brochure, Planters 900 Series Units/Modules Product Information, Aug. 1986 (4 pages).

(Continued)

*Primary Examiner* — Gary Hartmann
(74) *Attorney, Agent, or Firm* — Nixon Peabody LLP

(57) ABSTRACT

An agricultural system includes a tow bar, a first row-cleaning device, and a second row-cleaning device. The first row-cleaning device is attached to the tow bar via a first frame and includes a first roller device in a trailing position relative to a first furrow-opener disk and configured to crush standing residual plant matter along a first path on a field. The second row-cleaning device is attached to the tow bar via a second frame and includes a second roller device in a trailing position relative to a second furrow-opener disk and configured to crush standing residual plant matter along a second path on the field. The second roller device is offset longitudinally from the first roller device.

16 Claims, 15 Drawing Sheets

(51) Int. Cl.
    *A01B 61/04* (2006.01)
    *A01D 34/835* (2006.01)
    *A01C 7/06* (2006.01)

(56) References Cited

U.S. PATENT DOCUMENTS

| | | |
|---|---|---|
| 353,491 A | 2/1886 | Wells |
| 523,508 A | 7/1894 | Bauer |
| 736,369 A | 8/1903 | Dynes |
| 803,088 A | 10/1905 | Barker |
| 1,069,264 A * | 8/1913 | Keller .................. A01B 29/041 172/154 |
| 1,134,462 A | 4/1915 | Kendrick |
| 1,158,023 A | 10/1915 | Beaver |
| 1,247,744 A | 11/1917 | Trimble |
| 1,260,752 A | 3/1918 | Casaday |
| 1,321,040 A | 11/1919 | Hoffman |
| 1,391,593 A | 9/1921 | Sweeting |
| 1,398,668 A | 11/1921 | Bordsen |
| 1,791,462 A | 2/1931 | Bermel |
| 1,844,255 A | 2/1932 | Kaupke |
| 1,901,299 A | 3/1933 | Johnson |
| 1,901,778 A | 3/1933 | Schlag |
| 2,014,334 A | 9/1935 | Johnson |
| 2,058,539 A | 10/1936 | Welty |
| 2,269,051 A | 1/1942 | Cahoy |
| 2,341,143 A | 2/1944 | Herr |
| 2,505,276 A | 4/1950 | Boroski |
| 2,561,763 A | 7/1951 | Waters |
| 2,593,176 A | 4/1952 | Patterson |
| 2,596,527 A | 5/1952 | Bushong |
| 2,611,306 A | 9/1952 | Strehlow |
| 2,612,827 A | 10/1952 | Baggette |
| 2,664,040 A | 12/1953 | Beard |
| 2,691,353 A | 10/1954 | Secondo |
| 2,692,544 A | 10/1954 | Jessup |
| 2,715,286 A | 8/1955 | Saveson |
| 2,754,622 A | 7/1956 | Rohnert |
| 2,771,044 A | 11/1956 | Putifer |
| 2,773,343 A | 12/1956 | Oppel |
| 2,777,373 A | 1/1957 | Pursche |
| 2,799,234 A | 7/1957 | Chancey |
| 2,805,574 A | 9/1957 | Jackson, Jr. |
| 2,925,872 A | 2/1960 | Darnell |
| 2,960,358 A | 11/1960 | Christison |
| 3,010,744 A | 11/1961 | Hollis |
| 3,014,547 A | 12/1961 | Van der Lely |
| 3,038,424 A | 6/1962 | Johnson |
| 3,042,121 A | 7/1962 | Broetzman |
| 3,057,092 A | 10/1962 | Curlett |
| 3,058,243 A | 10/1962 | McGee |
| 3,065,879 A | 11/1962 | Jennings |
| 3,080,004 A * | 3/1963 | McNair .................. A01B 39/08 172/587 |
| 3,110,973 A | 11/1963 | Reynolds |
| 3,122,901 A | 3/1964 | Thompson |
| 3,123,152 A | 3/1964 | Biskis |
| 3,188,989 A | 6/1965 | Johnston |
| 3,213,514 A | 10/1965 | Evans |
| 3,250,109 A | 5/1966 | Spyridakis |
| 3,314,278 A | 4/1967 | Bergman |
| 3,319,589 A | 5/1967 | Moran |
| 3,351,139 A | 11/1967 | Schmitz |
| 3,355,930 A | 12/1967 | Fedorov |
| 3,368,788 A | 2/1968 | Padula |
| 3,368,789 A | 2/1968 | Martin |
| 3,370,450 A | 2/1968 | Scheucher |
| 3,420,273 A | 1/1969 | Greer |
| 3,447,495 A | 6/1969 | Miller |
| 3,539,020 A | 11/1970 | Andersson |
| 3,543,603 A | 12/1970 | Gley |
| 3,561,541 A | 2/1971 | Woelfel |
| 3,576,098 A | 4/1971 | Brewer |
| 3,581,685 A | 6/1971 | Taylor |
| 3,593,720 A | 7/1971 | Botterill |
| D221,461 S | 8/1971 | Hagenstad |
| 3,606,745 A | 9/1971 | Girodat |
| 3,635,495 A | 1/1972 | Orendorff |
| 3,650,334 A | 3/1972 | Hagenstad |
| 3,653,446 A | 4/1972 | Kalmon |
| 3,701,327 A | 10/1972 | Krumholz |
| 3,708,019 A | 1/1973 | Ryan |
| 3,718,191 A | 2/1973 | Williams |
| 3,749,035 A | 7/1973 | Cayton |
| 3,753,341 A | 8/1973 | Berg, Jr. |
| 3,766,988 A | 10/1973 | Whitesides |
| 3,774,446 A | 11/1973 | Diehl |
| 3,795,291 A | 3/1974 | Naito |
| 3,939,846 A | 2/1976 | Drozhzhin |
| 3,945,532 A | 3/1976 | Marks |
| 3,975,890 A | 8/1976 | Rodger |
| 4,009,668 A | 3/1977 | Brass |
| 4,018,101 A | 4/1977 | Mihalic |
| 4,044,697 A | 8/1977 | Swanson |
| 4,055,126 A | 10/1977 | Brown |
| 4,058,171 A | 11/1977 | van der Lely |
| 4,063,597 A | 12/1977 | Day |
| 4,096,730 A | 6/1978 | Martin |
| 4,099,576 A | 7/1978 | Jilani |
| 4,122,715 A | 10/1978 | Yokoyama |
| 4,129,082 A | 12/1978 | Betulius |
| 4,141,200 A | 2/1979 | Johnson |
| 4,141,302 A | 2/1979 | Morrison, Jr. |
| 4,141,676 A | 2/1979 | Jannen |
| 4,142,589 A | 3/1979 | Schlagenhauf |
| 4,147,305 A | 4/1979 | Hunt |
| 4,149,475 A | 4/1979 | Bailey |
| 4,157,661 A | 6/1979 | Schindel |
| 4,173,259 A | 11/1979 | Heckenkamp |
| 4,182,099 A | 1/1980 | Davis |
| 4,187,916 A | 2/1980 | Harden |
| 4,191,262 A | 3/1980 | Sylvester |
| 4,194,575 A | 3/1980 | Whalen |
| 4,196,567 A | 4/1980 | Davis |
| 4,196,917 A | 4/1980 | Oakes |
| 4,206,817 A | 6/1980 | Bowerman |
| 4,208,974 A | 6/1980 | Dreyer |
| 4,213,408 A | 7/1980 | West |
| 4,225,191 A | 9/1980 | Knoski |
| 4,233,803 A | 11/1980 | Davis |
| 4,241,674 A | 12/1980 | Mellinger |
| 4,249,613 A | 2/1981 | Scribner |
| 4,280,419 A | 7/1981 | Fischer |
| 4,295,532 A | 10/1981 | Williams |
| 4,301,870 A | 11/1981 | Carre |
| 4,307,674 A | 12/1981 | Jennings |
| 4,311,104 A | 1/1982 | Steilen |
| 4,317,355 A | 3/1982 | Hatsuno |
| 4,359,101 A | 11/1982 | Gagnon |
| 4,375,837 A | 3/1983 | van der Lely |
| 4,377,979 A | 3/1983 | Peterson |
| 4,391,335 A | 7/1983 | Birkenbach |
| 4,398,608 A | 8/1983 | Boetto |
| 4,407,371 A | 10/1983 | Hohl |
| 4,430,952 A | 2/1984 | Murray |
| 4,433,568 A | 2/1984 | Kondo |
| 4,438,710 A | 3/1984 | Paladino |
| 4,445,445 A | 5/1984 | Sterrett |
| 4,461,355 A | 7/1984 | Peterson |
| 4,481,830 A | 11/1984 | Smith |
| 4,499,775 A | 2/1985 | Lasoen |
| 4,506,610 A | 3/1985 | Neal |
| 4,508,178 A | 4/1985 | Cowell |
| 4,528,920 A | 7/1985 | Neumeyer |
| 4,530,405 A | 7/1985 | White |
| 4,537,262 A | 8/1985 | van der Lely |
| 4,538,688 A | 9/1985 | Szucs |
| 4,550,122 A | 10/1985 | David |
| 4,553,607 A | 11/1985 | Behn |
| 4,580,506 A | 4/1986 | Fleischer |
| 4,596,200 A | 6/1986 | Gafford |
| 4,598,654 A | 7/1986 | Robertson |
| 4,603,746 A | 8/1986 | Swales |
| 4,604,906 A | 8/1986 | Scarpa |

(56) References Cited

U.S. PATENT DOCUMENTS

| | | |
|---|---|---|
| 4,630,773 A | 12/1986 | Ortlip |
| 4,643,043 A | 2/1987 | Furuta |
| 4,646,620 A | 3/1987 | Buchl |
| 4,646,850 A | 3/1987 | Brown |
| 4,650,005 A | 3/1987 | Tebben |
| 4,669,550 A | 6/1987 | Sittre |
| 4,671,193 A | 6/1987 | States |
| 4,674,578 A | 6/1987 | Bexten |
| 4,703,809 A | 11/1987 | Van den Ende |
| 4,726,304 A | 2/1988 | Dreyer |
| 4,738,461 A | 4/1988 | Stephenson |
| 4,744,316 A | 5/1988 | Lienemann |
| 4,762,075 A | 8/1988 | Halford |
| 4,765,190 A | 8/1988 | Strubbe |
| 4,768,387 A | 9/1988 | Kemp |
| 4,779,684 A | 10/1988 | Schultz |
| 4,785,890 A | 11/1988 | Martin |
| 4,825,957 A | 5/1989 | White |
| 4,825,959 A | 5/1989 | Wilhelm |
| 4,920,901 A | 5/1990 | Pounds |
| 4,926,767 A | 5/1990 | Thomas |
| 4,930,431 A | 6/1990 | Alexander |
| 4,986,367 A | 1/1991 | Kinzenbaw |
| 4,998,488 A | 3/1991 | Hansson |
| 5,015,997 A | 5/1991 | Strubbe |
| 5,027,525 A | 7/1991 | Haukaas |
| 5,033,397 A | 7/1991 | Colburn, Jr. |
| 5,065,632 A | 11/1991 | Reuter |
| 5,074,227 A | 12/1991 | Schwitters |
| 5,076,180 A | 12/1991 | Schneider |
| 5,092,255 A | 3/1992 | Long |
| 5,113,957 A | 5/1992 | Tamai |
| 5,129,282 A | 7/1992 | Bassett |
| 5,136,934 A | 8/1992 | Darby, Jr. |
| 5,190,112 A | 3/1993 | Johnston |
| 5,224,553 A | 7/1993 | Heintzman |
| 5,234,060 A | 8/1993 | Carter |
| 5,240,080 A | 8/1993 | Bassett |
| 5,255,617 A | 10/1993 | Williams |
| 5,269,237 A | 12/1993 | Baker |
| 5,282,389 A | 2/1994 | Faivre |
| 5,285,854 A | 2/1994 | Thacker |
| 5,333,694 A | 8/1994 | Roggenbuck |
| 5,337,832 A | 8/1994 | Bassett |
| 5,341,754 A | 8/1994 | Winterton |
| 5,346,019 A | 9/1994 | Kinzenbaw |
| 5,346,020 A | 9/1994 | Bassett |
| 5,349,911 A | 9/1994 | Holst |
| 5,351,635 A | 10/1994 | Hulicsko |
| 5,379,847 A | 1/1995 | Snyder |
| 5,394,946 A | 3/1995 | Clifton |
| 5,398,771 A | 3/1995 | Hornung |
| 5,419,402 A | 5/1995 | Heintzman |
| 5,427,192 A | 6/1995 | Stephenson |
| 5,443,023 A | 8/1995 | Carroll |
| 5,443,125 A | 8/1995 | Clark |
| 5,461,995 A | 10/1995 | Winterton |
| 5,462,124 A | 10/1995 | Rawson |
| 5,473,999 A | 12/1995 | Rawson |
| 5,474,135 A | 12/1995 | Schlagel |
| 5,477,682 A | 12/1995 | Tobiasz |
| 5,477,792 A | 12/1995 | Bassett |
| 5,479,868 A | 1/1996 | Bassett |
| 5,479,992 A | 1/1996 | Bassett |
| 5,485,796 A | 1/1996 | Bassett |
| 5,485,886 A | 1/1996 | Bassett |
| 5,497,717 A | 3/1996 | Martin |
| 5,497,837 A | 3/1996 | Kehrney |
| 5,499,683 A | 3/1996 | Bassett |
| 5,499,685 A | 3/1996 | Downing, Jr. |
| 5,517,932 A | 5/1996 | Ott |
| 5,524,525 A | 6/1996 | Nikkel |
| 5,531,171 A | 7/1996 | Whitesel |
| 5,542,362 A | 8/1996 | Bassett |
| 5,544,709 A | 8/1996 | Lowe |
| 5,562,165 A | 10/1996 | Janelle |
| 5,590,611 A | 1/1997 | Smith |
| 5,603,269 A | 2/1997 | Bassett |
| 5,623,997 A | 4/1997 | Rawson |
| 5,640,914 A | 6/1997 | Rawson |
| 5,657,707 A | 8/1997 | Dresher |
| 5,660,126 A | 8/1997 | Freed |
| 5,685,245 A | 11/1997 | Bassett |
| 5,704,430 A | 1/1998 | Smith |
| 5,709,271 A | 1/1998 | Bassett |
| 5,725,057 A | 3/1998 | Taylor |
| 5,727,638 A | 3/1998 | Wodrich |
| 5,852,982 A | 12/1998 | Peter |
| 5,868,207 A | 2/1999 | Langbakk |
| 5,878,678 A | 3/1999 | Stephens |
| RE36,243 E | 7/1999 | Rawson |
| 5,953,895 A | 9/1999 | Hobs |
| 5,970,891 A | 10/1999 | Schlagel |
| 5,970,892 A | 10/1999 | Wendling |
| 5,988,293 A | 11/1999 | Brueggen |
| 6,067,918 A | 5/2000 | Kirby |
| 6,068,061 A | 5/2000 | Smith |
| 6,091,997 A | 7/2000 | Flamme |
| 6,164,385 A | 12/2000 | Buchl |
| 6,223,663 B1 | 5/2001 | Wendling |
| 6,223,828 B1 | 5/2001 | Paulson |
| 6,237,696 B1 | 5/2001 | Mayerle |
| 6,253,692 B1 | 7/2001 | Wendling |
| 6,314,897 B1 | 11/2001 | Hagny |
| 6,325,156 B1 | 12/2001 | Barry |
| 6,330,922 B1 | 12/2001 | King |
| 6,331,142 B1 | 12/2001 | Bischoff |
| 6,343,661 B1 | 2/2002 | Thompson |
| 6,347,594 B1 | 2/2002 | Wendling |
| 6,382,326 B1 | 5/2002 | Goins |
| 6,389,999 B1 | 5/2002 | Duello |
| 6,453,832 B1 | 9/2002 | Schaffert |
| 6,454,019 B1 | 9/2002 | Prairie |
| 6,460,623 B1 | 10/2002 | Knussman |
| 6,516,595 B2 | 2/2003 | Rhody |
| 6,530,334 B2 | 3/2003 | Hagny |
| 6,575,104 B2 | 6/2003 | Brummelhuis |
| 6,644,224 B1 | 11/2003 | Bassett |
| 6,681,868 B2 | 1/2004 | Kovach |
| 6,701,856 B1 | 3/2004 | Zoske |
| 6,701,857 B1 | 3/2004 | Jensen |
| 6,715,433 B1 | 4/2004 | Friestad |
| 6,786,130 B2 | 9/2004 | Steinlage |
| 6,834,598 B2 | 12/2004 | Jüptner |
| 6,840,853 B2 | 1/2005 | Foth |
| 6,886,650 B2 | 5/2005 | Bremner |
| 6,912,963 B2 | 7/2005 | Bassett |
| 6,968,907 B1 | 11/2005 | Raper |
| 6,986,313 B2 | 1/2006 | Halford |
| 6,997,400 B1 | 2/2006 | Hanna |
| 7,004,090 B2 | 2/2006 | Swanson |
| 7,044,070 B2 | 5/2006 | Kaster |
| 7,063,167 B1 | 6/2006 | Staszak |
| 7,159,523 B2 | 1/2007 | Bourgault |
| 7,222,575 B2 | 5/2007 | Bassett |
| 7,290,491 B2 | 11/2007 | Summach |
| 7,360,494 B2 | 4/2008 | Martin |
| 7,360,495 B1 | 4/2008 | Martin |
| 7,438,006 B2 * | 10/2008 | Mariman ............... A01C 5/068 111/164 |
| 7,451,712 B2 | 11/2008 | Bassett |
| 7,523,709 B1 | 4/2009 | Kiest |
| 7,540,333 B2 * | 6/2009 | Bettin ............... A01B 63/26 172/397 |
| 7,575,066 B2 | 8/2009 | Bauer |
| 7,584,707 B2 | 9/2009 | Sauder |
| 7,665,539 B2 | 2/2010 | Bassett |
| 7,673,570 B1 | 3/2010 | Bassett |
| 7,743,718 B2 | 6/2010 | Bassett |
| 7,870,827 B2 | 1/2011 | Bassett |
| 7,918,285 B1 | 4/2011 | Graham |
| 7,938,074 B2 | 5/2011 | Liu |
| 7,944,210 B2 | 5/2011 | Fischer |
| 7,946,231 B2 | 5/2011 | Martin |

(56) References Cited

U.S. PATENT DOCUMENTS

| | | |
|---|---|---|
| 8,146,519 B2 | 4/2012 | Bassett |
| 8,151,717 B2 | 4/2012 | Bassett |
| 8,171,707 B2 | 5/2012 | Kitchel |
| D663,326 S | 7/2012 | Allensworth |
| 8,327,780 B2 | 12/2012 | Bassett |
| 8,359,988 B2 | 1/2013 | Bassett |
| 8,380,356 B1 | 2/2013 | Zielke |
| 8,386,137 B2 | 2/2013 | Sauder |
| 8,393,407 B2 | 3/2013 | Freed |
| 8,408,149 B2 | 4/2013 | Rylander |
| 8,544,397 B2 | 10/2013 | Bassett |
| 8,544,398 B2 | 10/2013 | Bassett |
| 8,550,020 B2 | 10/2013 | Sauder |
| 8,573,319 B1 | 11/2013 | Casper |
| 8,634,992 B2 | 1/2014 | Sauder |
| 8,636,077 B2 | 1/2014 | Bassett |
| 8,763,713 B2 | 7/2014 | Bassett |
| 8,770,308 B2 | 7/2014 | Bassett |
| 8,776,702 B2 | 7/2014 | Bassett |
| RE45,091 E | 8/2014 | Bassett |
| 8,863,857 B2 | 10/2014 | Bassett |
| 8,910,581 B2 | 12/2014 | Bassett |
| 8,939,095 B2 * | 1/2015 | Freed ............... A01B 49/027 111/164 |
| 8,985,232 B2 | 3/2015 | Bassett |
| 9,003,982 B1 * | 4/2015 | Elizalde ............. A01B 49/027 111/155 |
| 9,003,983 B2 | 4/2015 | Roth |
| 9,055,712 B2 | 6/2015 | Bassett |
| 9,107,337 B2 | 8/2015 | Bassett |
| 9,107,338 B2 | 8/2015 | Bassett |
| 9,113,589 B2 | 8/2015 | Bassett |
| 9,144,187 B2 | 9/2015 | Bassett |
| 9,148,989 B2 * | 10/2015 | Van Buskirk ......... A01C 5/066 |
| 9,167,740 B2 | 10/2015 | Bassett |
| 9,192,088 B2 * | 11/2015 | Bruce ............... A01B 49/06 |
| 9,192,089 B2 | 11/2015 | Bassett |
| 9,192,091 B2 | 11/2015 | Bassett |
| 9,215,838 B2 | 12/2015 | Bassett |
| 9,215,839 B2 | 12/2015 | Bassett |
| 9,226,440 B2 | 1/2016 | Bassett |
| 9,232,687 B2 | 1/2016 | Bassett |
| 9,241,438 B2 * | 1/2016 | Bassett ............. A01B 49/027 |
| 9,271,437 B2 | 3/2016 | Martin |
| 9,307,690 B2 | 4/2016 | Bassett |
| 2002/0162492 A1 | 11/2002 | Juptner |
| 2003/0141086 A1 * | 7/2003 | Kovach ............. A01B 13/08 172/799.5 |
| 2004/0005929 A1 | 1/2004 | Piasecki |
| 2006/0102058 A1 | 5/2006 | Swanson |
| 2006/0191695 A1 | 8/2006 | Walker et al. |
| 2006/0237203 A1 | 10/2006 | Miskin |
| 2007/0044694 A1 | 3/2007 | Martin |
| 2007/0272134 A1 | 11/2007 | Baker |
| 2008/0093093 A1 | 4/2008 | Sheppard |
| 2008/0173220 A1 | 7/2008 | Wuertz |
| 2008/0236461 A1 | 10/2008 | Sauder |
| 2008/0256916 A1 | 10/2008 | Vaske |
| 2010/0019471 A1 | 1/2010 | Ruckle |
| 2010/0108336 A1 | 5/2010 | Thomson |
| 2010/0180695 A1 | 7/2010 | Sauder |
| 2010/0198529 A1 | 8/2010 | Sauder |
| 2010/0282480 A1 | 11/2010 | Breker |
| 2011/0247537 A1 | 10/2011 | Freed |
| 2011/0313575 A1 | 12/2011 | Kowalchuk |
| 2012/0167809 A1 | 7/2012 | Bassett |
| 2012/0186216 A1 | 7/2012 | Vaske |
| 2012/0216731 A1 | 8/2012 | Schilling |
| 2012/0232691 A1 | 9/2012 | Green |
| 2012/0255475 A1 | 10/2012 | Mariman |
| 2013/0032363 A1 | 2/2013 | Curry |
| 2013/0112121 A1 | 5/2013 | Achen |
| 2013/0112124 A1 | 5/2013 | Bergen |
| 2013/0213676 A1 | 8/2013 | Bassett |
| 2013/0325267 A1 | 12/2013 | Adams |
| 2013/0333599 A1 | 12/2013 | Bassett |
| 2014/0026748 A1 | 1/2014 | Stoller |
| 2014/0034339 A1 | 2/2014 | Sauder |
| 2014/0034343 A1 | 2/2014 | Sauder |
| 2014/0034344 A1 | 2/2014 | Bassett |
| 2014/0060864 A1 | 3/2014 | Martin |
| 2014/0190712 A1 | 7/2014 | Bassett |
| 2014/0197249 A1 | 7/2014 | Roth |
| 2014/0224513 A1 | 8/2014 | Van Buskirk |
| 2015/0216108 A1 | 8/2015 | Roth |
| 2015/0237791 A1 | 8/2015 | Bassett |
| 2015/0373901 A1 | 12/2015 | Bassett |
| 2016/0066498 A1 | 3/2016 | Bassett |
| 2016/0128263 A1 | 5/2016 | Bassett |
| 2016/0128265 A1 | 5/2016 | Bassett |
| 2016/0270285 A1 * | 9/2016 | Hennes ............... A01B 61/046 |
| 2016/0309641 A1 * | 10/2016 | Taunton ............... A01B 63/02 |

FOREIGN PATENT DOCUMENTS

| | | |
|---|---|---|
| DE | 335464 | 9/1921 |
| DE | 1108971 | 6/1961 |
| DE | 24 02 411 | 7/1975 |
| EP | 2 196 337 B1 | 6/2010 |
| EP | 2 497 348 A1 | 9/2012 |
| GB | 1 574 412 | 9/1980 |
| GB | 2 056 238 A | 10/1982 |
| JP | 54-57726 | 5/1979 |
| SU | 392897 | 8/1973 |
| SU | 436778 | 7/1974 |
| SU | 611201 | 6/1978 |
| SU | 625648 | 9/1978 |
| SU | 1410884 A1 | 7/1988 |
| SU | 1466674 | 3/1989 |
| WO | WO 2009/145381 A1 | 12/2009 |
| WO | WO 2011/161140 A1 | 12/2011 |
| WO | WO 2012/149367 A1 | 1/2012 |
| WO | WO 2012/149415 A1 | 1/2012 |
| WO | WO 2012/167244 A1 | 12/2012 |
| WO | WO 2013/025898 A1 | 2/2013 |

OTHER PUBLICATIONS

Buffalo Farm Equipment All Flex Cultivator Operator Manual, Apr. 1990 (7 pages).
Shivvers, Moisture Trac 3000 Brochure, Aug. 21, 1990 (5 pages).
The New Farm, "New Efficiencies in Nitrogen Application," Feb. 1991, p. 6 (1 page).
Hiniker Company, Flow & Acreage Continuous Tracking System Monitor Demonstration Manuel, date estimated as early as Feb. 1991 (7 pages).
Russnogle, John, "Sky Spy: Gulf War Technology Pinpoints Field and Yields," Top Producer, A Farm Journal Publication, Nov. 1991, pp. 12-14 (4 pages).
Borgelt, Steven C., "Sensor Technologies and Control Strategies for Managing Variability," University of Missouri, Apr. 14-16, 1992 (15 pages).
Buffalo Farm Equipment Catalog on Models 4600, 4630, 4640, and 4620, date estimated as early as Feb. 1992 (4 pages).
Hiniker 5000 Cultivator Brochure, date estimated as early as Feb. 1992 (4 pages).
Hiniker Series 5000 Row Cultivator Rigid and Folding Toolbar Operator's Manual, date estimated as early as Feb. 1992 (5 pages).
Orthman Manufacturing, Inc., Rowcrop Cultivator Booklet, date estimated as early as Feb. 1992 (4 pages).
Yetter Catalog, date estimated as early as Feb. 1992 (4 pages).
Exner, Rick, "Sustainable Agriculture: Practical Farmers of Iowa Reducing Weed Pressure in Ridge-Till," Iowa State University University Extension, http://www.extension.iastate.edu/Publications/SA2.pdf, Jul. 1992, Reviewed Jul. 2009, retrieved Nov. 2, 2012 (4 pages).
Finck, Charlene, "Listen to Your Soil," Farm Journal Article, Jan. 1993, pp. 14-15 (2 pages).
Acu-Grain, "Combine Yield Monitor 99% Accurate? 'You Bet Your Bushels!!'" date estimated as early as Feb. 1993 (2 pages).

(56) References Cited

OTHER PUBLICATIONS

John Deere, New 4435 Hydro Row-Crop and Small-Grain Combine, date estimated as early as Feb. 1993 (8 pages).
Vansichen, R. et al., "*Continuous Wheat Yield Measurement on a Combine*," date estimated as early as Feb. 1993 (5 pages).
Yetter 2010 Product Catalog, date estimated as early as Jan. 2010 (2 pages).
Yetter Cut and Move Manual, Sep. 2010 (28 pages).
John Deere, Seat Catalog, date estimated as early Sep. 2011 (19 pages).
Martin Industries, LLC Paired 13 Spading Closing Wheels Brochure, date estimated as early as Jun. 6, 2012, pp. 18-25 (8 pages).
Vogt, Willie, "*Revisiting Robotics*," http://m.farmindustrynews.com/farm-eqiupment/revisiting-robotics, Dec. 19, 2013, (3 pages).
John Deere, New Semi-Active Sea Suspension, http://www.deere.com/en_US/parts/agparts/semiactiveseat.html, date estimated as early as Jan. 2014, retrieved Feb. 6, 2014 (2 pages).

* cited by examiner

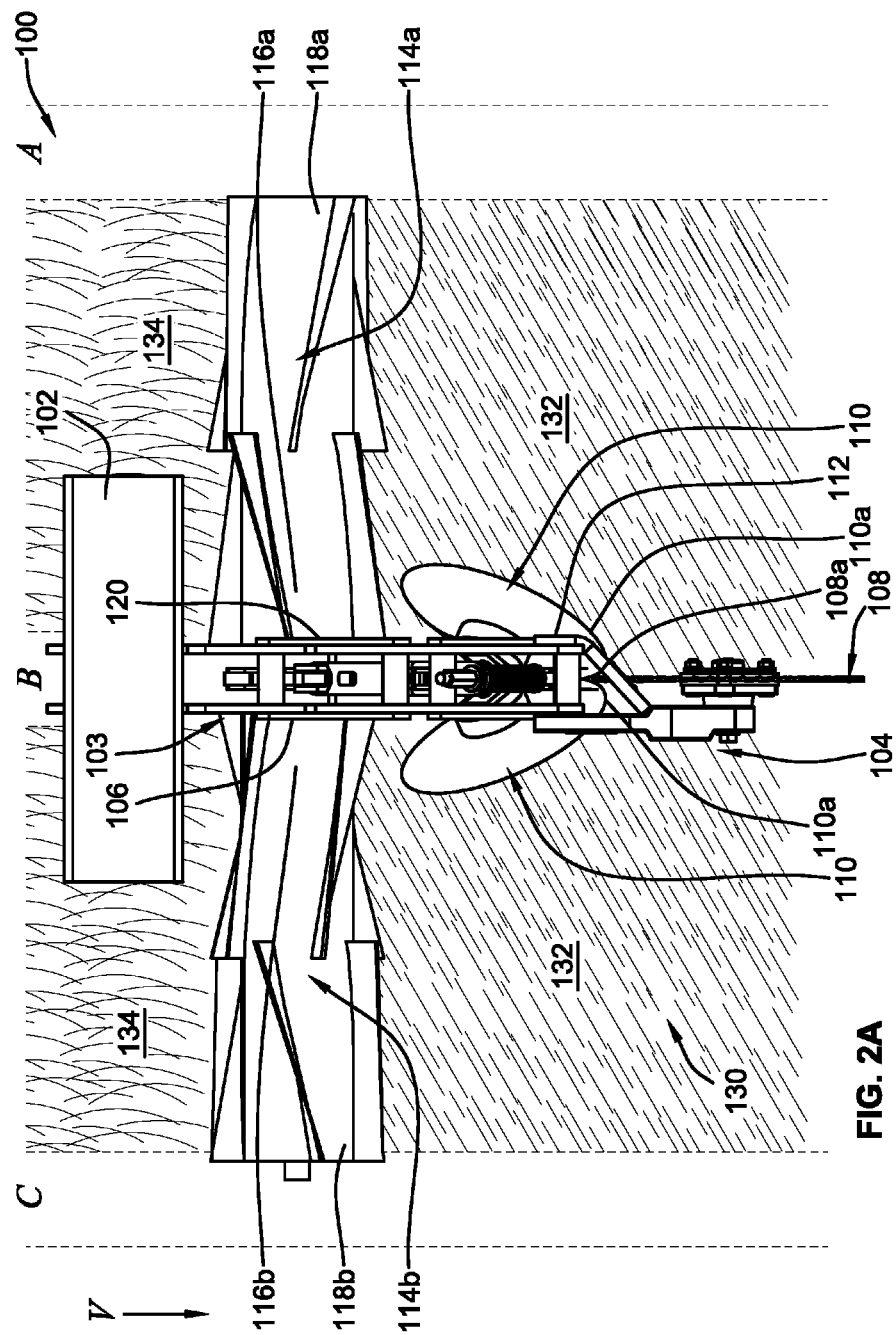

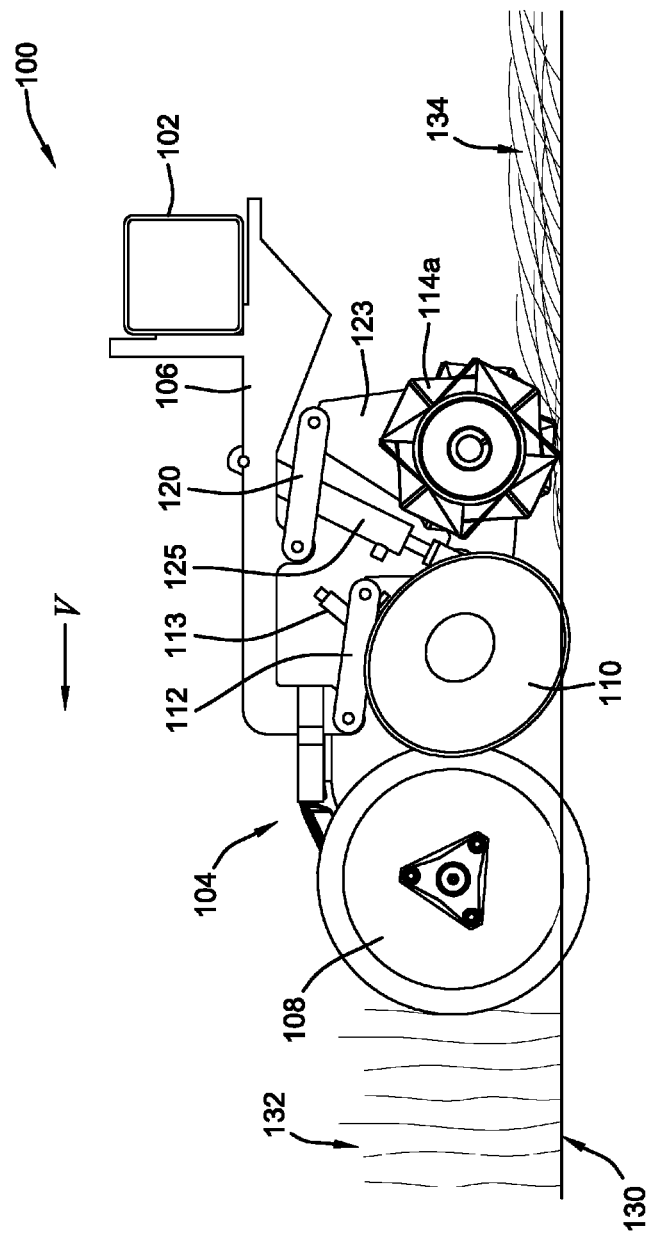

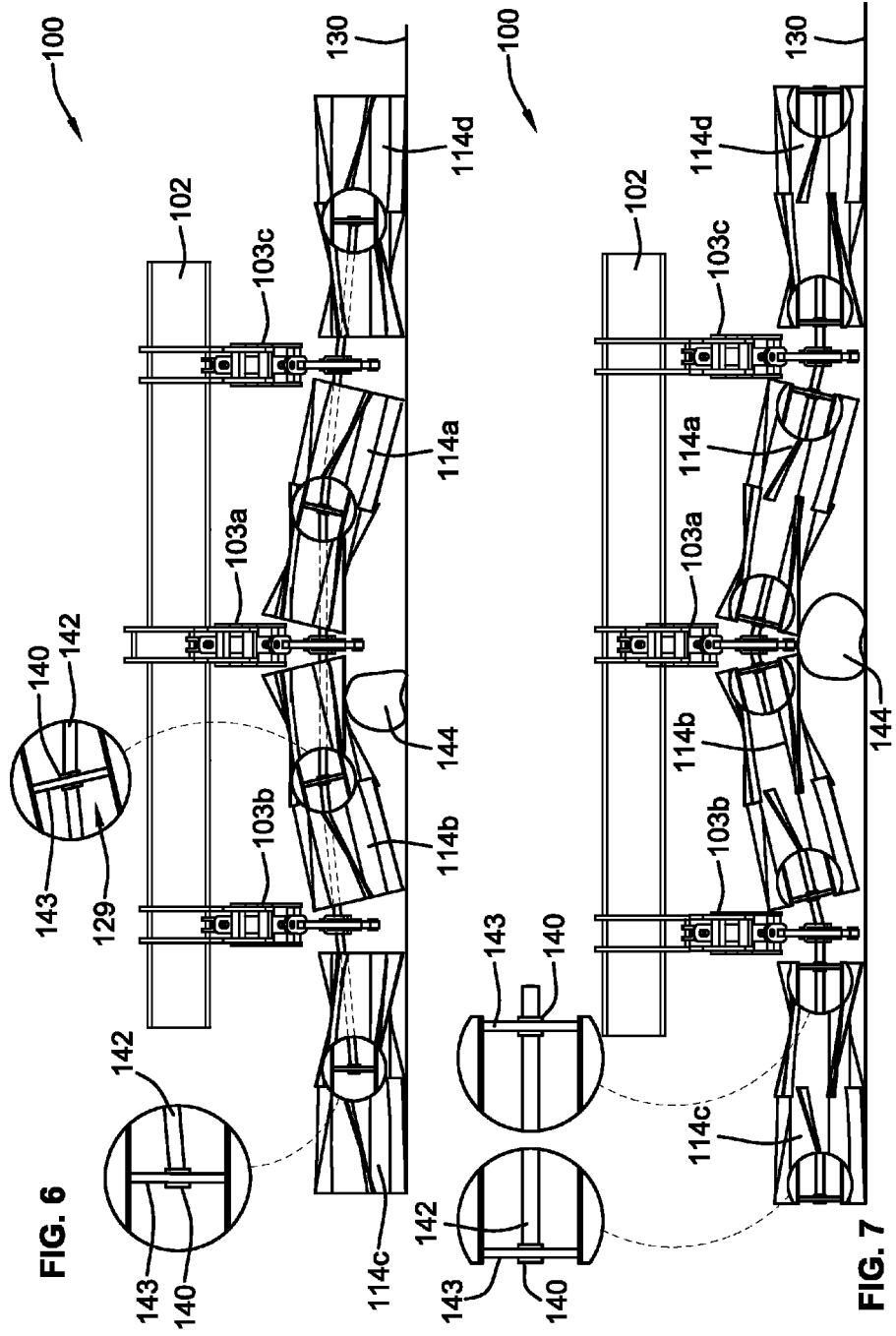

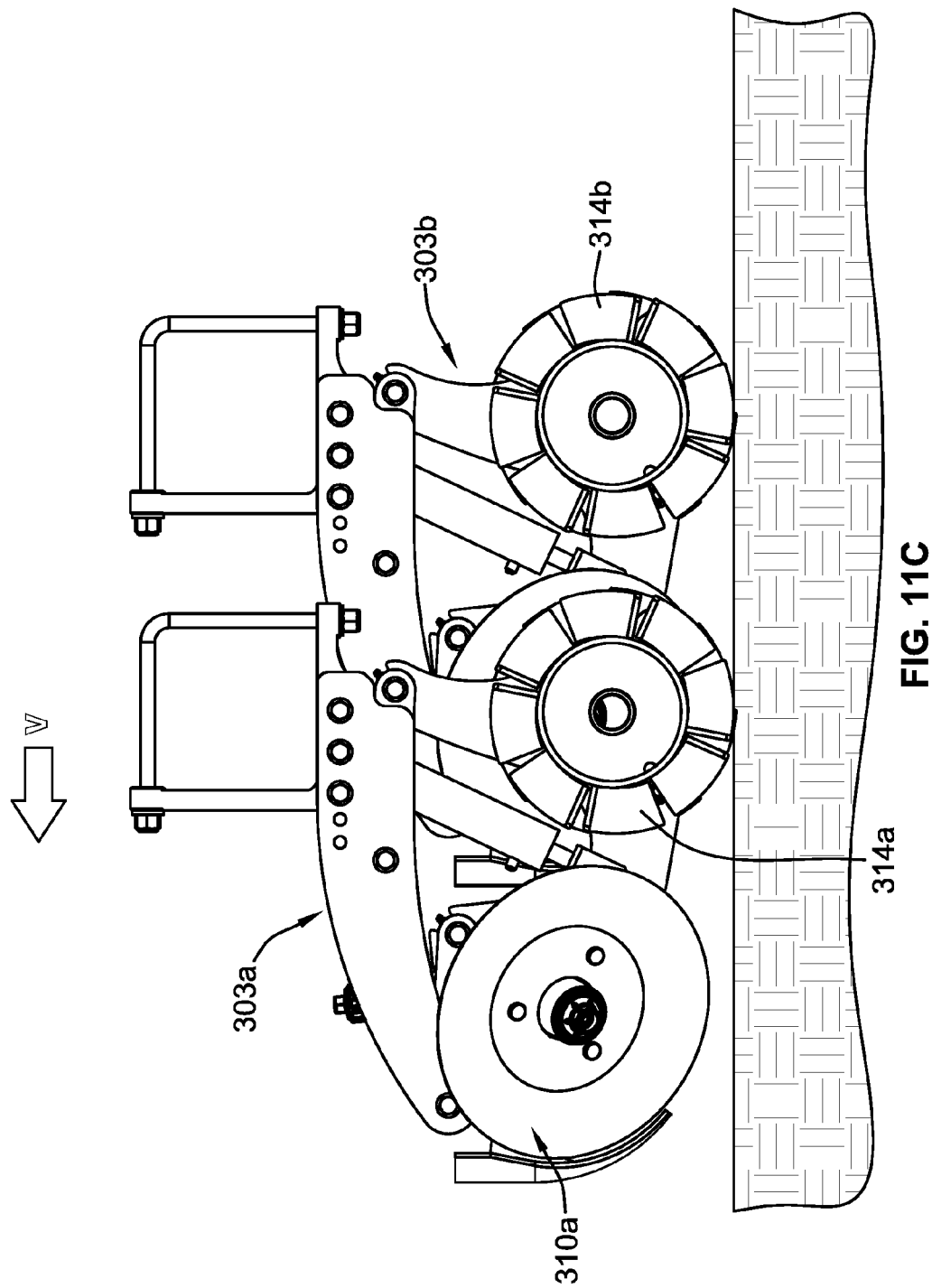

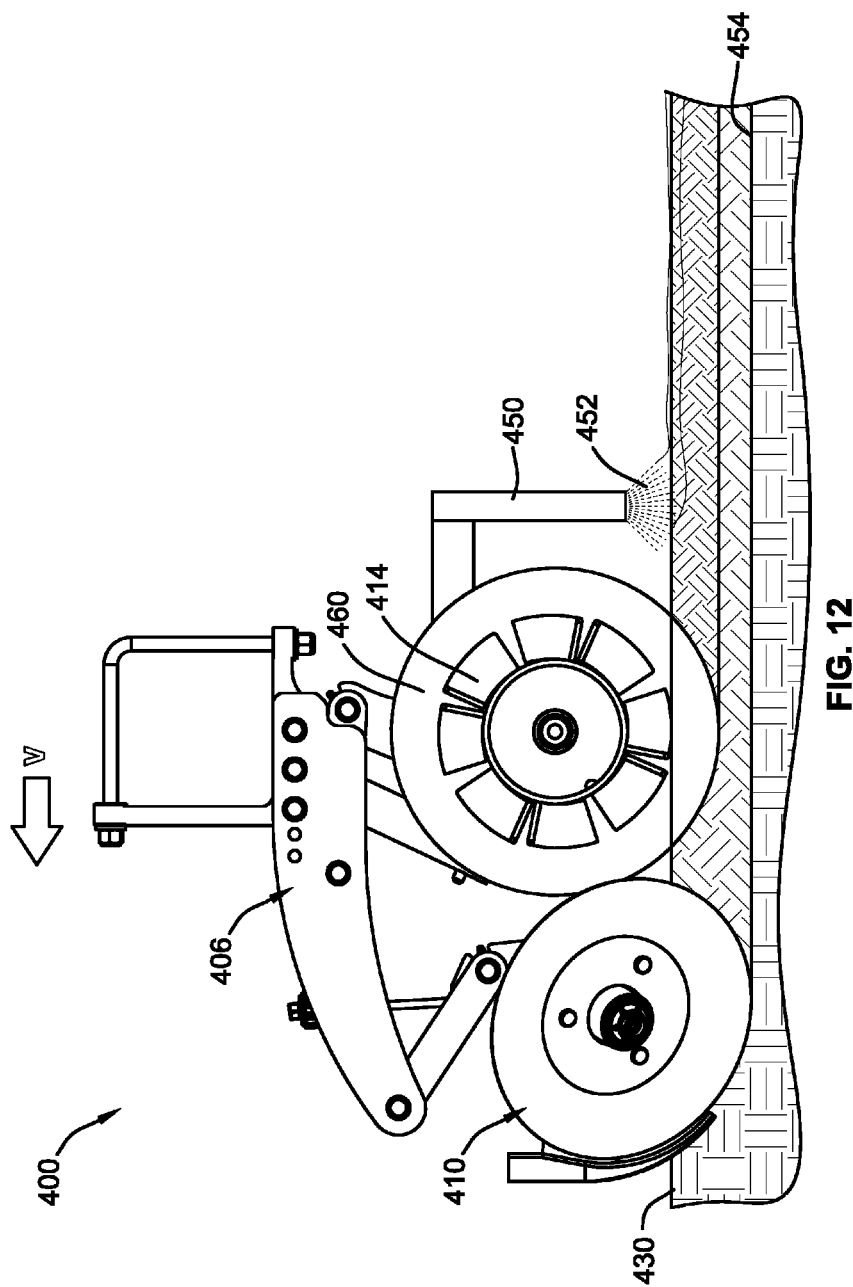

AGRICULTURAL SYSTEM FOR FIELD PREPARATION

CROSS-REFERENCE TO RELATED APPLICATION

This application is a continuation-in-part of U.S. patent application Ser. No. 14/172,905, filed on Feb. 5, 2014, for an "Agricultural System For Field Preparation," which is incorporated by reference herein in its entirety.

FIELD OF THE INVENTION

The present invention relates generally to agricultural equipment and, more particularly, to a system having a roller device for preparing a field with leftover residual plant matter.

BACKGROUND OF THE INVENTION

As plant matter is leftover on a field from one season to the next, farming operations continue to struggle with residual stubble when preparing the field for a new crop. These challenges are especially evident in no-till farming, which has become more popular over the recent years. For example, planting seeds between rows of leftover corn stalks is difficult without removing or minimizing the presence of the corn stalks in the planted rows.

Thus, it would be desirable to develop a system that overcomes the problems and limitations associated with leftover residual plant matter.

SUMMARY OF THE INVENTION

In accordance with one embodiment, an agricultural system includes a tow bar for attachment to a towing vehicle in a trailing position relative to a direction of movement along a field. The agricultural system further includes a first row-cleaning device attached via a first frame to the tow bar, the first row-cleaning device including at least one first furrow-opener disk and a first roller device. The first roller device is in a trailing position relative to the at least one first furrow-opener disk and has a first longitudinal axis perpendicular to a direction of movement V along the field. The first roller device is configured to crush standing residual plant matter along a first path on the field.

The agricultural system further includes a second row-cleaning device attached via a second frame to the tow bar, the second row-cleaning device including at least one second furrow-opener disk and a second roller device. The second roller device is in a trailing position relative to the at least one second furrow-opener disk and has a second longitudinal axis perpendicular to the direction of movement V along the field. The second longitudinal axis of the second roller device is offset from the first longitudinal axis of the first roller device. The second roller device is configured to crush standing residual plant matter along a second path on the field.

In accordance with another embodiment, an agricultural system includes a first row-cleaning unit having a first frame configured for mounting to a tow bar, at least one first furrow-opener disk attached to the first frame in a leading position and being configured to form a first furrow, and a first roller device attached to the first frame in a trailing position relative to the at least one first furrow-opener disk. The first roller device is configured to crush standing residual plant matter along a first path in a field, and has a first longitudinal axis perpendicular to a direction of movement V along the field. The first row-cleaning unit further has a fertilizer injector that is attached to the first frame in a trailing position relative to the first roller device and that is configured to deposit fertilizer into the first furrow.

The agricultural system further includes a second row-cleaning unit having a second frame configured for mounting to a tow bar, at least one second furrow-opener disk attached to the second frame in a leading position and being configured to form a second furrow, and a second roller device attached to the second frame in a trailing position relative to the at least one second furrow-opener disk. The second roller device is configured to crush standing residual plant matter along a second path in a field, and has a second longitudinal axis perpendicular to a direction of movement V along the field. The second longitudinal axis of the first roller device is offset from the first longitudinal axis of the first roller device. The second row-cleaning unit further has a fertilizer injector that is attached to the second frame in a trailing position relative to the second roller device and that is configured to deposit fertilizer into the second furrow.

BRIEF DESCRIPTION OF THE DRAWINGS

The invention may best be understood by reference to the following description taken in conjunction with the accompanying drawings.

FIG. 2A is a top view of the agricultural system of FIG. 1.

FIG. 5 is a side view of the agricultural system of FIG. 1.

FIG. 6 is a front view diagrammatic illustrating roller devices having a single central roller bearing.

FIG. 7 is front view diagrammatic illustrating roller devices having two roller bearings at respective ends.

FIG. 11C is a side view of the agricultural system of FIG. 11A.

FIG. 12 is a side view of an agricultural system having a roller device with a fertilizer injector.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
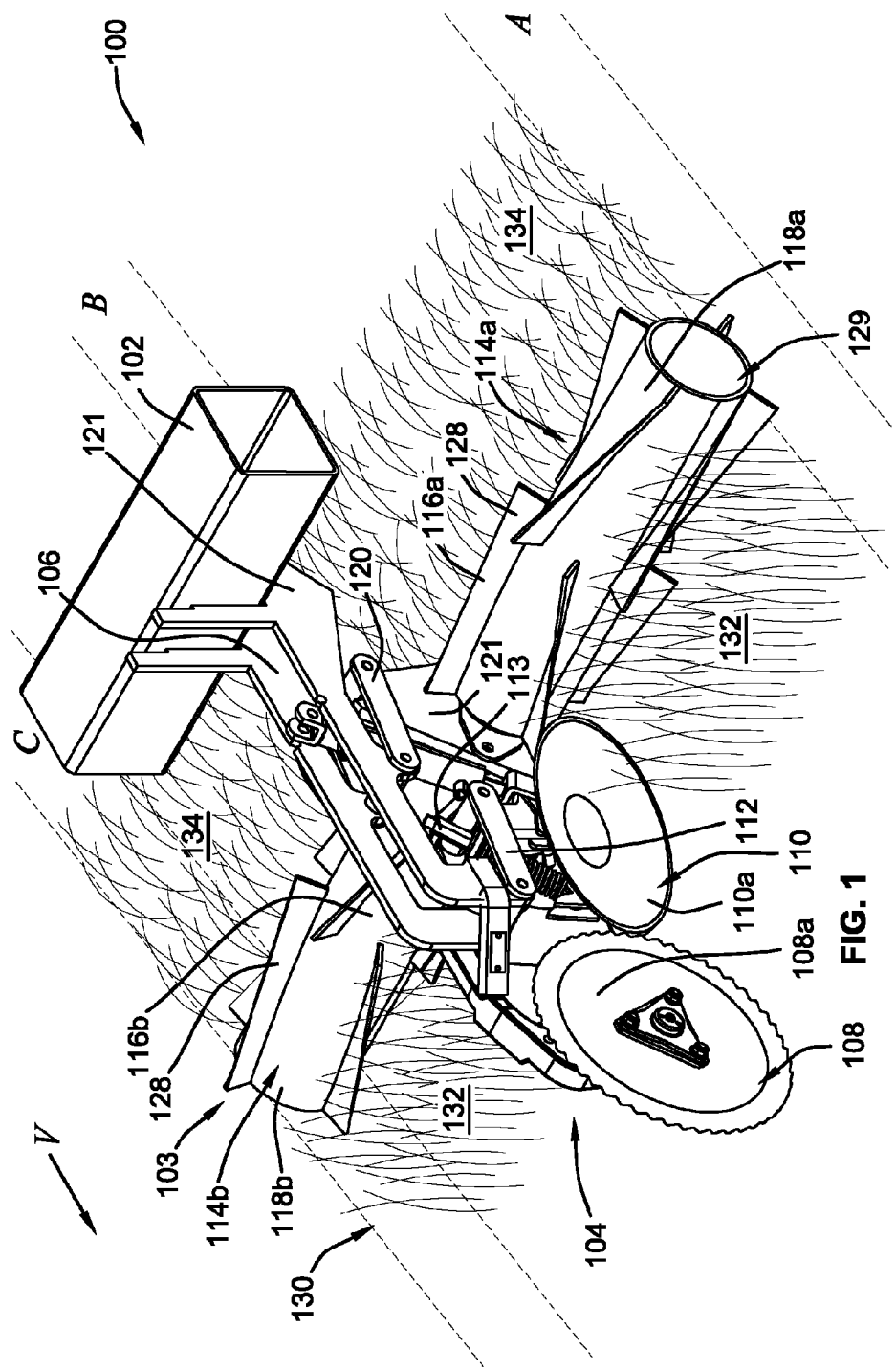
FIG. 1 is a perspective view of an agricultural system having a roller device and a row-cleaning device.

Turning now to the drawings and referring first to FIGS. 1 and 2A, an agricultural system 100 includes a tow bar 102 for attachment to a towing vehicle, such as a tractor. The tow bar 102 is in a trailing position relative to a direction of movement V (see FIG. 2A) along a field 130 and includes a row unit 103a.

The row unit 103a includes a row-cleaning device 104 and a rigid frame 106 for attachment to the tow bar 102 The row-cleaning device 104 includes a leading coulter 108 and a pair of furrow-opener disks 110 that are attached in a trailing position relative to the leading coulter 108, each of the furrow-opener disks 110 having a leading edge 110a adjacent to a trailing edge 108a of the leading coulter 108. Only one of the furrow-opener disks 110 is visible in FIG. 1, with the second of the furrow-opener disks 110 being visible in FIG. 2A.

More specifically, the furrow-opener disks 110 have the respective leading edges 110a adjacent to each other and near the trailing edge 108a of the leading coulter 108. The leading coulter 108 is positioned such that the leading edges 110a of the two furrow-opener disks 110 are obscured by the trailing edge 108a of the leading coulter 108 from a front farming position. The front farming position is forward of the row-cleaning device 104 along the direction of movement V along the field 130.

The row-cleaning device 104 is attached to the agricultural system 100 in a respective strip position B of a plurality of parallel strip positions along the tow bar 102. As further illustrated in FIG. 4, and described in more detail below, the parallel strip positions include at least the strip positions A-D.

A pivotable row-cleaning linkage 112 is attached to the rigid frame 106. The leading coulter 108 and the furrow-opener disks 110 are coupled to the rigid frame 106 via the pivotable row-cleaning linkage 112. Additionally, a supplemental force for up-down movement is provided via a row-cleaning actuator 113. The row-cleaning linkage 112 is a parallel linkage according to one exemplary embodiment.

A first roller device 114a has a first end 116a and a second end 118a. The first end 116a is attached to the rigid frame 106 via a pivotable roller linkage 120. More specifically, the first end 116a is directly attached to a separator frame 121, which, in turn, is attached to the roller linkage 120. The second end 118a is attached in a similar manner as the first end 116a, near the parallel strip position A, illustrated in FIG. 2A, and to an adjacent rigid frame via another pivotable roller linkage. The roller linkage 120 is independently movable relative to the row-cleaning linkage 112 and, according to an exemplary embodiment, is a parallel linkage.

A second roller device 114b has a first end 116b and a second end 118b. The second roller device 114b is attached similarly to the first roller device 114a, with the first end 116b being attached to an opposite side of the separator frame 121, for indirect attachment to the rigid frame 106 via the roller linkage 120. The second end 118b of the second roller device 114b is near a respective parallel strip position C, illustrated in FIG. 4, and attached to an adjacent rigid frame via another pivotable roller linkage.

Each of the roller devices 114a, 114b includes a plurality of roller protrusions 128 that extend outwardly from a peripheral surface of the respective roller device 114a, 114b. The roller protrusions 128 are attached, for example, to the respective peripheral surface via welding or mechanical fasteners. One advantage of the roller protrusions 128 is directed to reducing the amount of force required to crush residual plant matter, based on the reduction of surface area of contact surfaces between the roller devices 114a, 114b and residual plant matter. Alternatively, the roller protrusions 128 are integrally formed from a single piece of material, for example, by machining the roller devices 114a, 114b with the roller protrusions 128 in a unitary construction. Alternatively yet, the roller devices 114a, 114b lack any roller protrusions 128 and are generally cylindrically shaped segments with substantially smooth surfaces.

The roller devices 114a, 114b are generally cylindrically shaped with a hollow (or partially hollow) interior 129 through which a supporting axle is mounted (as illustrated in FIGS. 6 and 7) for supporting the rotational motion of the roller devices 114a, 114b. In alternative examples, the roller devices 114a, 114b are solid cylinders, with a central hole for accommodating the supporting axle, or partially hollow cylinders. Added material in the hollow interior 129 increase the weight and strength of the roller devices 114a, 114b to further increase the crushing capability of the roller devices 114a, 114b. Less material in the hollow interior 129 increase the flexibility of the roller devices 114a, 114b to move past terrain obstacles when encountered in the field 130.

In the illustrated embodiment, the roller devices 114a, 114b are mounted in a trailing position relative to the row-cleaning device 104. However, in an alternative embodiment the roller devices 114a, 114b are mounted in a forward position relative to the row-cleaning device 104.

In yet other alternative embodiments, at least one of the roller devices 114a, 114b is a crimping device attached to an agricultural device having one or more separators. The crimping device is described in more detail in U.S. Patent Application Publication No. 2013/0000535 to Charles H. Martin and Dominic R. Martin, titled "Agricultural Field Preparation Device," published on Jan. 3, 2013, and which is herein incorporated by reference in its entirety.

The agricultural system 100 is movable in a direction V along a field 130 in which standing residual plant matter 132 forward of the row-cleaning device 104 is leveled by the roller device 114a into crushed residual plant matter 134. The residual plant matter, such as small grain cover crop, can include (for example) barley, wheat, oats, spelt, rye, clover, weeds, etc.

The cover crops are typically planted after a primary crop has been harvested, such as corn, in order to reduce compaction of the soil. The type of field preparation that typically occurs simultaneously with crushing of the standing residual plant matter 132 is typically planting of a primary crop, such as corn. However, the agricultural system 100 is not limited to planting, and may include spreading fertilizer or other type of field preparation associated with "no-till" or other types of reduced tillage techniques, such as strip-tilling, if desired.

Figure 2B:
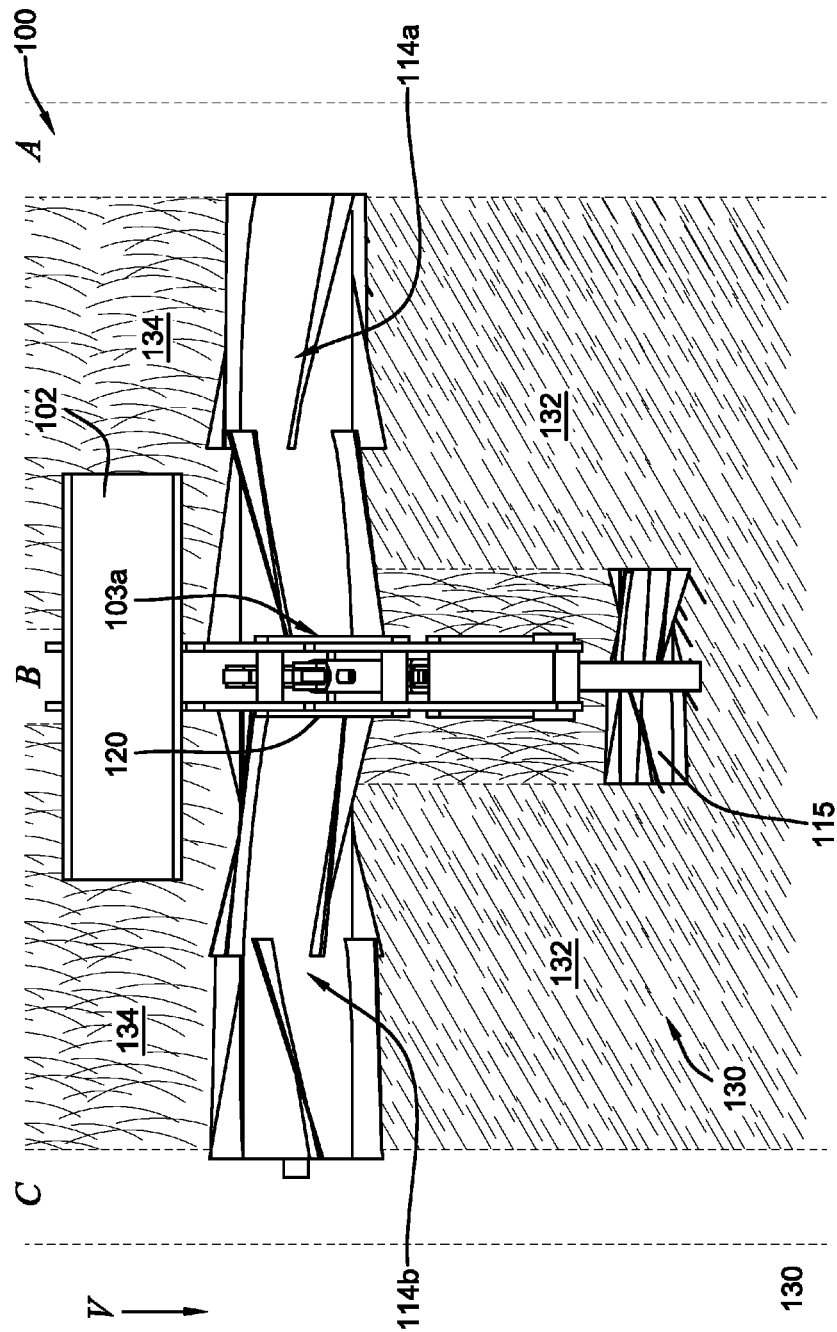
FIG. 2B is a top view of the agricultural system of FIG. 1 illustrated with an optional roller device attached instead of the row-cleaning device.

Referring to FIG. 2B, the agricultural system 100 is configured to include a mini-roller device 115, instead of the row-cleaning device 104. The mini-roller device 115 is sufficiently large to cover the surface area that would otherwise be strip B. As such, the mini-roller device 115, together with the first and second roller devices 114a, 114b, level and crush the standing residual plant matter 132 forward of the mini-roller device 115 without creating a strip between the first and second roller devices 114a, 114b. Instead, a single patch of crushed residual plant matter 134 is formed behind the agricultural system 100.

The mini-roller device 115 can be a miniature version of the roller device 114a, being attached to the row-cleaning linkage 112 (instead of the leading coulter 108 and the furrow-opener disks 110). Optionally, the mini-roller device 115 can be any size that sufficiently covers the surface area otherwise left uncovered between the first and second roller devices 114a, 114b.

Figure 3:
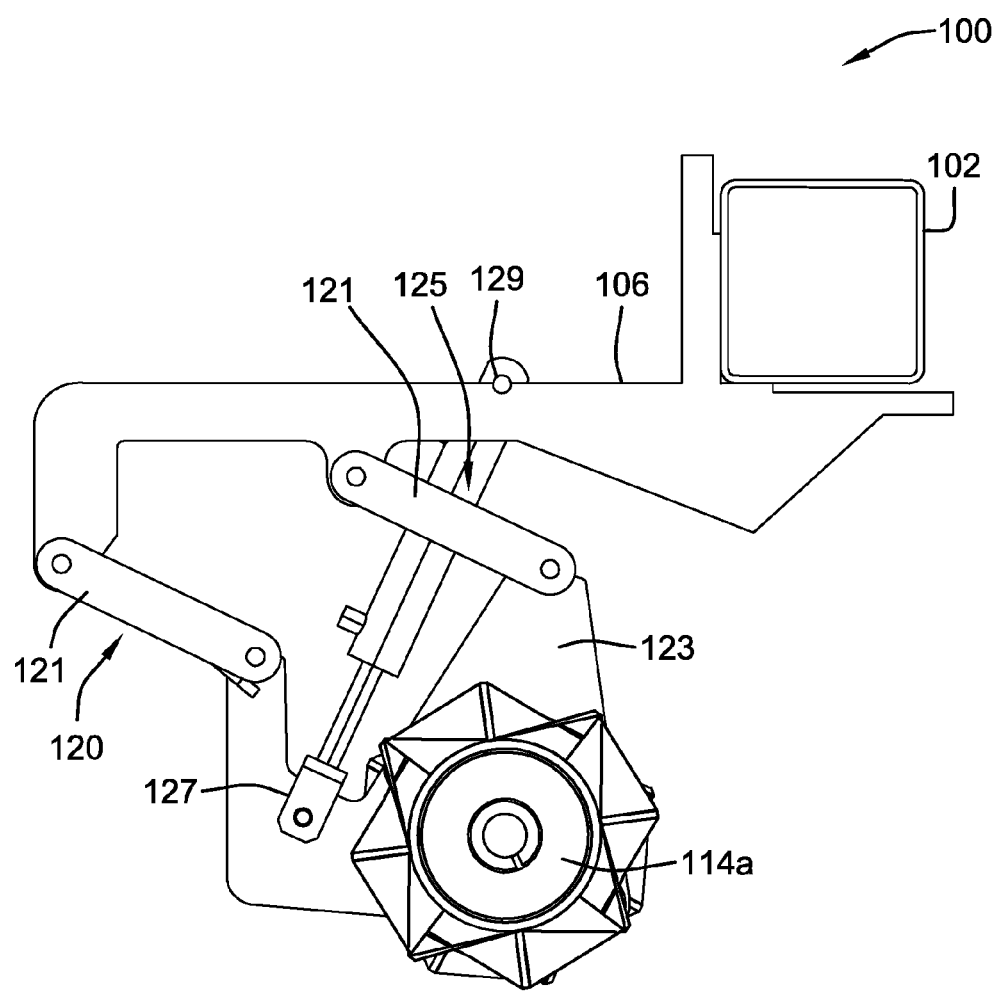
FIG. 3 is a side view of the agricultural system of FIG. 1 without the row-cleaning device.

Referring to FIG. 3, the roller linkage 120 includes a pair of parallel links 123 pivotably coupled between the rigid frame 106 and the separator frame 123. Pivotable movement of the parallel links 121 allows up-down movement of the roller device 114a relative to the ground. More specifically, in this example the up-down movement is achieved in response to an actuator force provided by a roller actuator 125.

The roller actuator 125 has a movable piston end 127 mounted to the separator frame 123 and a fixed end 129 mounted to the rigid frame 106. According to some examples, the roller actuator 125 is a hydraulic actuator or a pneumatic actuator. The force and movement of the roller actuator 125 and the roller linkage 120, relative to the rigid frame 106, is achieved independently of the row-cleaning linkage 112.

Figure 4:
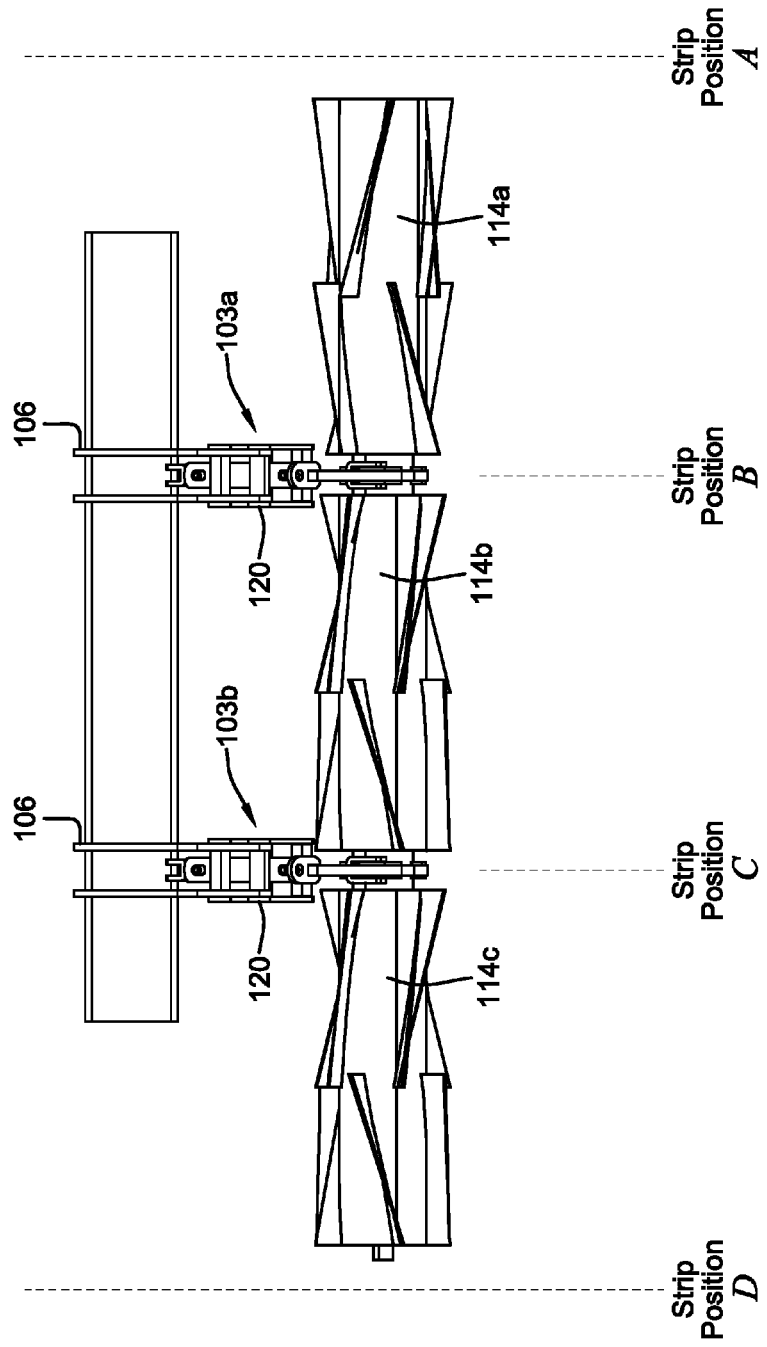
FIG. 4 is a front view of the agricultural system of FIG. 1 without the row-cleaning device.

A roller actuator 125 is coupled at each end of a respective roller device, such as the first end 116b and the second end 118b of the second roller device 114b illustrated in FIG. 4. Thus, each row unit, such as row units 103a, 103b illustrated in FIG. 4, has at least one respective roller actuator 125.

Referring to FIG. 4, the agricultural system 100 is illustrated having two adjacent row units 103a, 103b, mounted along the tow bar 102 at respective parallel strip positions B and C. Although not illustrated, similar or identical row units can be mounted along the tow bar 102 at strip positions A and D. Each of the row units 103a, 103b includes a respective rigid frame 106 and roller linkage 120. Three roller devices, including the first roller device 114a, the second roller device 114b, and a third roller device are 103c extend from and between respective ones of the row units 103a, 103b.

For example, the second roller device 114b extends between a first row unit 103a and a second row unit 103b. The first roller device 114a extends between the first row unit 103a and an adjacent row unit that is mounted (but not shown) along the tow bar 102 at the strip position A. The third roller device 103c extends between the second row unit 103b and an adjacent row unit that is mounted (but not shown) along the tow bar 102 at the strip position D. The row units at strip positions A and D are similar and/or identical to the first and second row units 103a, 103b.

Referring to FIG. 5, the row-cleaning device 104, including the leading coulter 108 and the furrow-opener disk 110, prepares exposed soil in the strip position B for an agricultural operation, such as planting. The roller device 114a crushes, at least in part, the stems of the standing residual plant matter 132 while maintaining the strip A of exposed soil. Alternatively, the roller device 114a is positioned in a forward position relative to the row-cleaning device 104, instead of being in the illustrated positioned rearward relative to the row-cleaning device 104.

Furthermore, as the agricultural system 100 advance in the direction V along the field 130, the row-cleaning device 104 moves up-down independent of the roller device 114a because each is independently attached to and actuated from the rigid frame 106. The roller device 114a moves pivotably and is actuated in response to a supplemental force provided by the roller actuator 125, as described above in reference to FIG. 3. In reference to the row-cleaning device 104, the row-cleaning linkage 112 is similarly pivotably attached to the rigid frame 106 and is actuated in response to a supplemental force provided by the row-cleaning actuator 113. Thus, as the row-cleaning device 104 and the roller device 114a encounter different field irregularities or obstacles, such as rocks, irregular terrain surfaces, and/or other debris, the row-cleaning device 104 and the roller device 114a can be independently adjusted to be positioned at a desired distance from the field irregularity and to apply a desired force to the field irregularity (e.g., a lower force if a rock is encountered, a greater force if hardened soil is encountered, etc.).

The row-cleaning actuator 113 is coupled between the row-cleaning linkage 112 and the rigid frame 106 to provide the desired supplemental force to the respective. The row-cleaning actuator 113, by way of example, is a hydraulic or pneumatic actuator.

One benefit of the agricultural system 100, in which the row-cleaning device 104 is combined with the roller device 114a is directed to preparing in a single pas strips of soil despite the presence of standing residual plant matter 132 in the field 130. Such agricultural actions like separating residual plant matter 132, crushing stems of the residual plant matter 132, and planting seeds in an open furrow of the strips, all occur within the same pass of the agricultural system 100.

Additional benefits of the agricultural system 100 are directed to the crushed residual plant matter 132. For example, the crushed residual plant matter 134 is effectively terminated or destroyed and remains in contact or in close proximity with the surface of the soil, returning nutrients to the soil, such as nitrogen, and thereby reducing the amount of fertilizer that must be subsequently applied to grow the primary crop. In another example, the crushed residual plant matter 132 remains in contact with or in close proximity with the surface of the soil helps maintain moisture in the soil. It has been shown that such increased moisture retention directly results in an increased yield of the primary crop. In yet another example, by virtue of the crushed residual plant matter 132 remaining in contact or in close proximity with the surface of the soil, a toxin is released as a result of which weed growth is substantially diminished without (or reduced) application of herbicides. In yet another example, the presence of residual plant matter 132 or cover crop, by virtue of the root mass of the residual plant matter 132, significantly reduces soil erosion that would otherwise occur without such ground cover after harvest of the primary crop.

Referring to FIG. 6, the agricultural system 100 is configured with single, centrally located roller bearings 140 for roller devices 114a-114d. The roller bearings 140 are centrally located along a central axle 142 within the hollow interior 129 of each roller device 114a-14d. The central axle 142 represents a rotational axis along which the roller devices 114a, 114d rotate, respectively. The roller bearings 140 are mounted to respective supporting brackets 143. As the agricultural system 100 is advanced along the field 130, the row units 103a-103c independently move up-and-down when obstacles, such as a rock 144, are encountered.

For example, the first row unit 103a moves up to advance past the rock 144 when the second roller device 114b encounters the rock 144. The rock 144 causes the second roller device 114b to flex upwards. The second roller device 114b pivots about the central roller bearing 140 and relative to the central axle 142, with the first end 116b moving upwards and the second end 118b moving downwards. The movement of the second roller device 114b causes movement of the first row unit 103a, which, in turn, causes movement of the first roller device 114a. The first roller device 114a, similar to the second roller device 114b, pivots about its central roller bearing and relative to its central axle 142, with the first end 116a moving upwards and the second end 118 a moving downwards. The second and third row units 103b, 103c, and the third and fourth roller devices 114c, 114d remain generally unaffected by the movement of the first row unit 103a and the first and second roller devices 114a, 114b.

Optionally, instead of a single roller bearing 140, two roller bearings are centrally located along one or more of the roller devices 114a-114d. Each of the two roller bearings is mounted on a respective, opposite side of the supporting bracket 143.

Referring to FIG. 7, the agricultural system 100 illustrated in FIG. 6 is alternatively configured with two roller bearings 140 at respective ends of the roller devices 114a-114d. Thus, instead of a single, centrally located, roller bearing 140, two side roller bearings 140 are provided for each of the roller devices 114a-114d. Each of the side roller bearing 140 is mounted along the central axle 142 to a supporting bracket 143. Optionally, for increased flexibility in pivoting movement, two side roller bearings 140 are mounted at each end of one or more of the roller devices 114a-114d.

Figure 8:
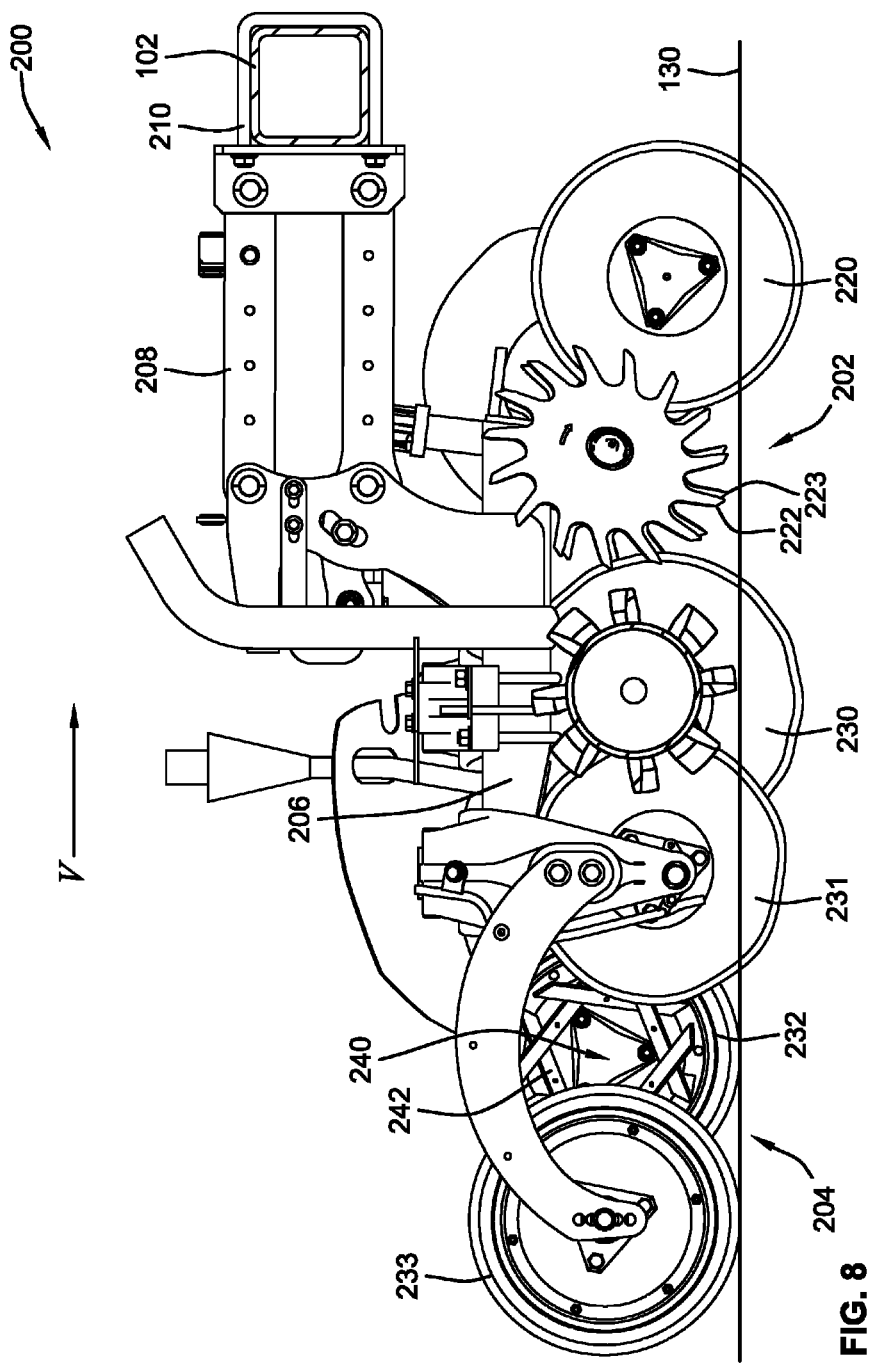
FIG. 8 is a side view of an agricultural system having a leading residue-clearing sub-assembly, a trailing tillage and depth-control-subassembly, and a roller device.

Referring to FIG. 8, an agricultural system 200 includes a row unit 201 with a leading residue-clearing sub-assembly 202 followed by a trailing tillage and depth-control sub-assembly 204. Both sub-assemblies 202, 204 are carried by a common frame 206 attached to a rear end of a four-bar linkage assembly 208, which, in turn, is attached to a front frame 210. The front frame 210 is adapted to be connected to the tow bar 102 of a towing vehicle. The agricultural system 200 is movable in a direction V along the field 130. Because both sub-assemblies 202, 204 are carried by the same frame 206, the relative relationship of all the components of the two sub-assemblies 202, 204 remains fixed so that they maintain a consistent set of dynamic properties governed by their relative sizes and positions rather than just the individual properties of the individual components.

The residue-clearing sub-assembly 202 includes a forward coulter wheel 220 flanked by a pair of toothed wheels 222, 223 overlapping a rear edge portion of the forward coulter wheel 220. Thus, the residue-clearing sub-assembly 202 is similar, but necessarily identical, to the row-cleaning device 104. The forward coulter wheel 220 cuts through the residue on the soil, such as stalks from a previous year's planting, and cuts a shallow slit in the soil. The trailing toothed residue-clearing wheels 222, 223 then kick the cut residue off to opposite sides of the slit cut by the forward coulter wheel 220, thus clearing a row for planting (e.g., strip rows A-C illustrated in FIG. 1), while at the same time cleaning the forward coulter wheel 220. To this end, the front edges of the toothed wheels 222, 223 are tilted inwardly toward the vertical plane of the forward coulter wheel 220 to assist in cleaning the forward coulter wheel 220, and the lower edges are tilted outwardly to assist in cleaning the row to be planted. This arrangement is particularly well suited for strip tilling, where the strip cleared for planting is typically only about 10 inches of the 30-inch center-to-center spacing between planted rows.

The tillage and depth-control sub-assembly 204 includes a pair of rearward coulter wheels 230, 231 that are offset from each other both laterally and fore and aft, and two gauge wheels 232, 233. The rear edges of the rearward coulter wheels 230, 231 are tilted inwardly toward the slit cut by the forward coulter wheel 220, and the lower edges of the rearward coulter wheels 230, 213 are tilted outwardly away from the slit. Thus, each of the rearward coulter wheels 230, 231 makes contact with the soil at an angle in two planes, causing each of the rearward coulter wheels 230, 231 to apply a force to the soil that is upward and toward the center of the row. The aggregate effect of this angular relationship on the soil is a turbulent swirling and mixing of the soil in the space between the two rearward coulter wheels 230, 231. The turbulent swirling and mixing of the soil incorporates air and residue into the soil, and, further, breaks the soil into finer pieces. Soil thrown laterally by the leading coulter wheel 230 is caught by the trailing coulter wheel 231 to retain that soil in the tilled area between the two rearward coulter wheels 230, 231 and to form a ridge for planting.

The gauge wheels 232, 233 control the depth to which the row unit 201 penetrates into the soil, and also intercept soil and residue thrown upwardly and laterally by the trailing coulter wheel 231, to retain that soil in the strip being tilled. This prevents soil loss form the tilled area and facilitates the creation of the ridge, or berm, which is desirable for planting. Because the height of the axes of rotation of all the wheels 220, 222, 223, 230, 231 is fixed relative to the height of the axes of rotation of the gauge wheels 232, 233, the interaction among all the wheels remains essentially the same at all times. Alternatively, instead of gauge wheels, the row unit 201 includes small-belted caterpillar tracks or similar devices for controlling the depth.

Each of the gauge wheels 232, 233 includes a swirl device 240 having multiple tines 242 and being attached to a central portion of the inboard side of each respective gauge wheel 232, 233. As such, the swirl device 240 is located rearwardly of the of the tillage device (e.g., rearward coulter wheels 230, 231) and is positioned to intercept soil and residue displaced upwardly by the tillage device. The swirl device 240 rotates with the respective gauge wheel 232, 233 and helps to control the distribution of soil moving toward the respective gauge wheel 232, 233 from the rearmost of the coulter wheels 220, 230, 231.

The swirl device 240 intercepts a portion of the soil and residue thrown upwardly and laterally towards the gauge wheels 232, 233 by the trailing coulter wheel 231 and distributes the intercepted soil and residue across the tilled strip adjacent the gauge wheels 232, 233. The swirl device 240 also helps to break up clumpy soil. Because the outside diameter of the swirl device 240 is smaller than the outside diameter of the gauge wheels 232, 233, the swirl device 240 operates above ground level and does not dig into the earth. Another benefit of the swirl device 240 is that it produces thorough incorporation of fertilizer, especially dry fertilizer, with the soil within the worked strip where it is needed by the plants, rather than leaving the fertilizer in concentrated ribbons. This allows the application of more fertilizer in the strip, possibly just ahead of the planter by a few hours, without burning the seed, and may eliminate a second trip to side dress. The total amount of fertilizer applied to produce optimum crop yields may even be reduced. Fertilizer that is not thoroughly incorporated in the soil may be lost to the atmosphere or runoff, which is costly and may pollute both ground water and surface water.

In the embodiment described above, all the coulter wheels 220, 230, 231 are corrugated or fluted coulter wheels, but a wide variety of different coulter wheels are well known in the agricultural industry, and any of them may be used. The same is true of the toothed residue-clearing wheels 222, 223—a wide variety of different configurations of toothed wheels are well known in the agricultural industry for residue clearing, and any of them may be used.

The illustrative row unit 201 is urged downwardly against the soil by its own weight. If it is desired to have the ability to increase this downward force, or to be able to adjust the force, a hydraulic or pneumatic cylinder and/or one or more springs may be added between the common frame 206 and the four-bar linkage assembly 208, or between the common frame 206 and the front frame 210, to urge the common frame 206 downwardly with a controllable force. Such a hydraulic cylinder may also be used to lift the row unit off the ground for transport by a heavier, stronger, fixed-height frame that is also used to transport large quantities of fertilizer for application via multiple residue-clearing and tillage row units.

The agricultural system 200 further includes a roller device 250 that is mounted for crushing residual plant matter. The configuration and/or attachment of the roller device 250 is similar to and/or identical to the roller devices 114a-114d described above in reference to FIGS. 1-7. In the illustrated embodiment of FIG. 8, the roller device 250 is in a trailing position relative to the forward coulter wheel 220. However, in alternative embodiments the roller device 250 is positioned in other desired positions relative to the forward coulter wheel 220.

Figure 9:
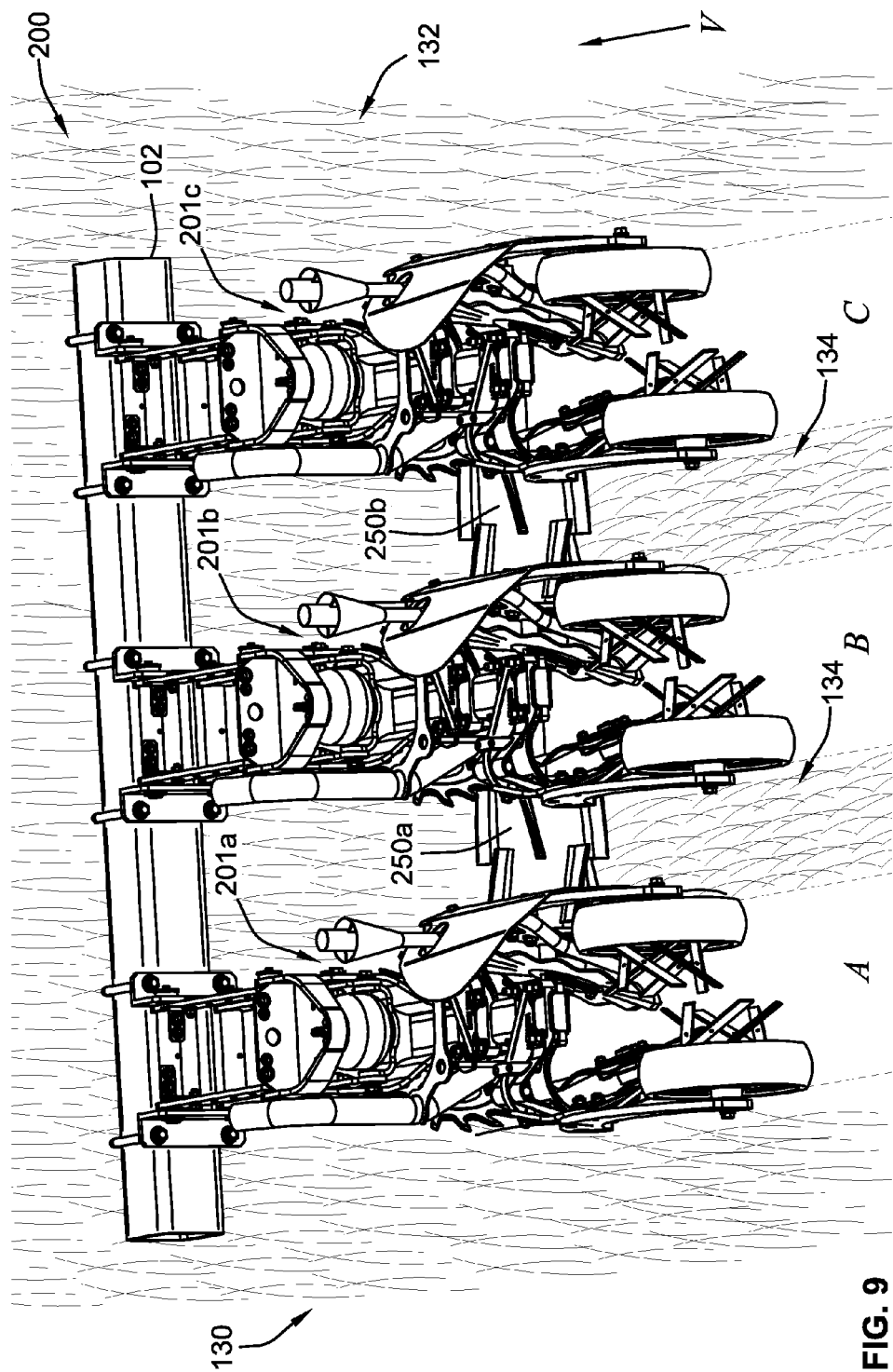
FIG. 9 is a perspective view of the agricultural system of FIG. 8.
Figure 10:
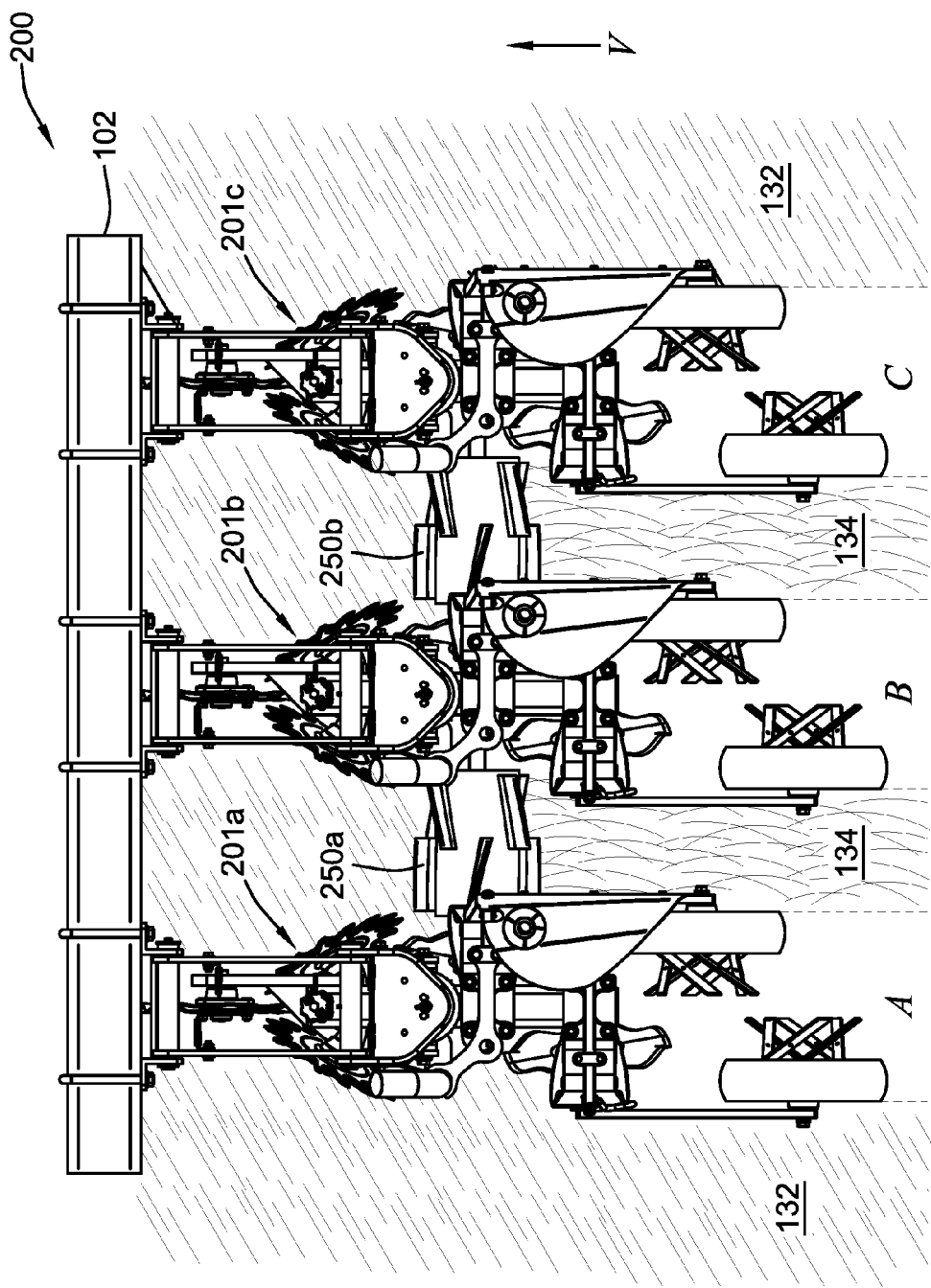
FIG. 10 is a top view of the agricultural system of FIG. 8.

Referring to FIGS. 9 and 10, the agricultural system 200 includes two roller devices 250a, 250b extending in-between three row units 201a-201c. As the agricultural system 200 is advanced in direction V along the field 103, the roller devices 250a, 250b level standing residual plant matter 132 into crushed residual plant matter 134. Simultaneously, the row units 201a-201c prepare strips of soil A-C in preparation for planting or other farming operation.

In alternative embodiments one or more of the wheels described above are forged blades with an induction hardened edge. The forged blades are beneficial because they are ductile and, as such, are not prone to shatter. Furthermore, in addition to being resisting to shattering, the forged blades maintain a hardened edge. In a further optional embodiment, one or more of the coulters described above is made of cast iron and includes a beveled edge.

In other alternative embodiments, various hydraulic configurations are included in one or more of the agricultural systems 100, 200. For example, hydraulic cylinders are mounted to any movable components of the agricultural systems 100, 200 in which a controllable down/up pressure is desired for maintaining a required component-to-ground pressure.

Figure 11A:
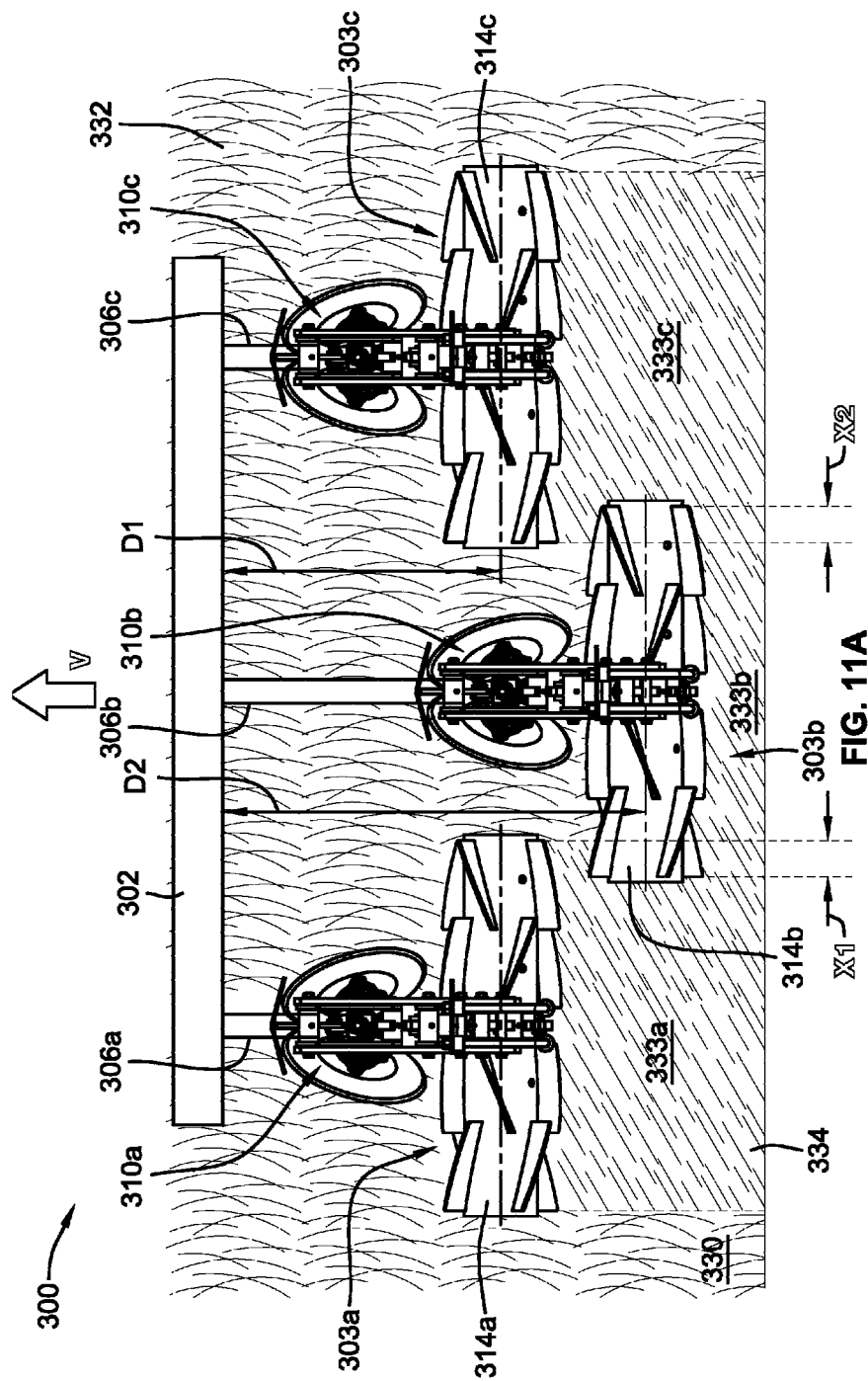
FIG. 11A is a top view of an agricultural system having roller devices in a shifted arrangement.
Figure 11B:
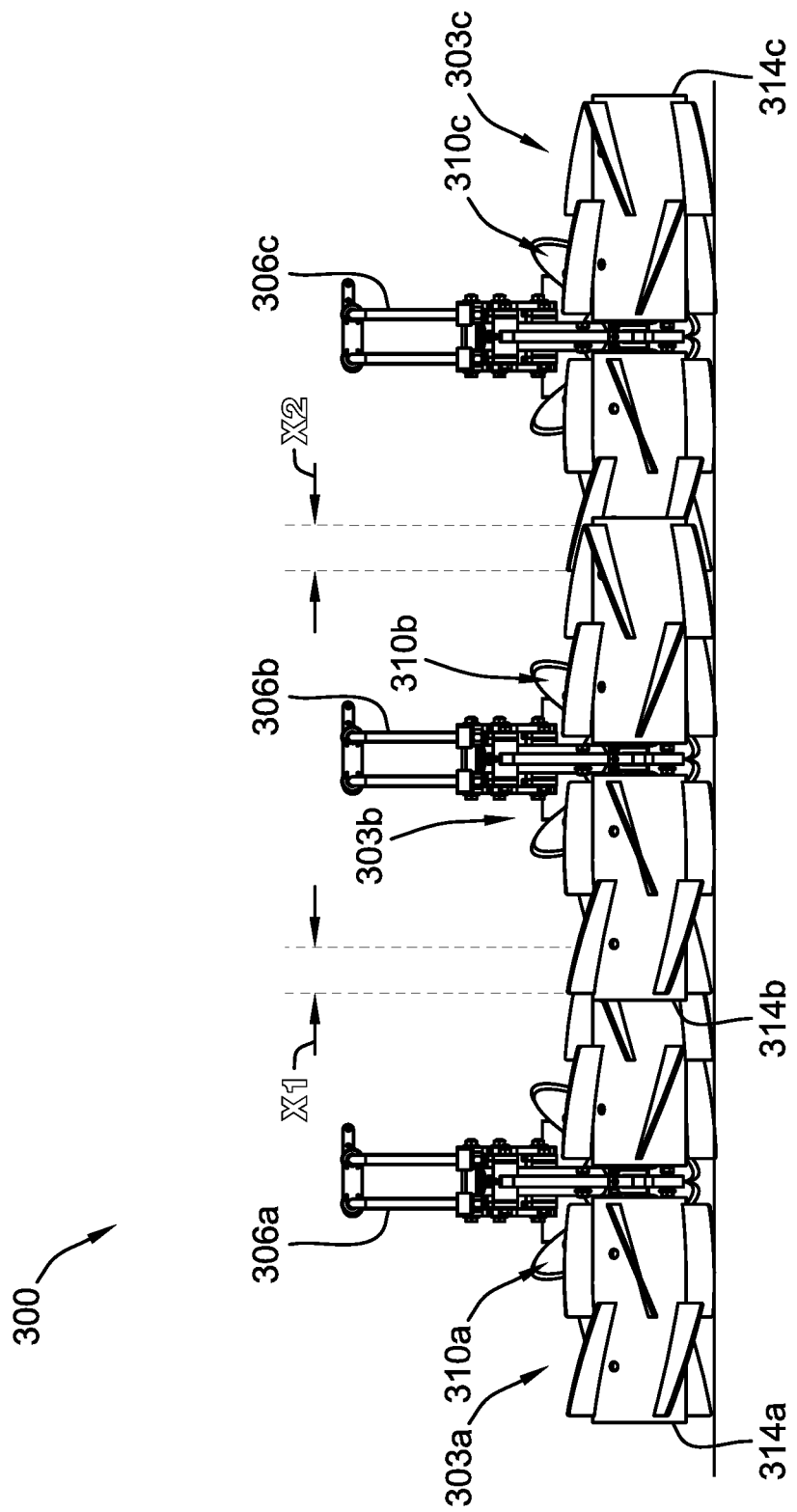
FIG. 11B is a rear view of the agricultural system of FIG. 11A.

Referring to FIGS. 11A-11C, an agricultural system 300 includes a tow bar 302 for attachment to a towing vehicle, such as a tractor. The tow bar 302 is in a trailing position relative to a direction of movement V along a field 330. The agricultural system 300 has a plurality of crimping roller units 303a-303c, including a left roller unit 303a, a middle roller unit 303b, and a right roller unit 303c. Each of the roller units 303a-303c has a respective pair of furrow-opener disks 310a-310c in a leading position relative to respective roller devices 314a-314c, which are attached to the tow bar 302 via respective frames 306a-306c. According to some embodiments, the agricultural system 300 includes one or more of the components described above in reference to FIGS. 1-10 and is configured to perform at least one or more of the described applicable functions. For example, the agricultural system 300 includes a leading coulter, a hydraulic actuator, and/or an independently movable roller linkage, and the roller units 303a-303c are row-cleaning devices.

The roller units 303a-303c are positioned in a shifted arrangement in which adjacent ones of the roller units 303a-303c are offset relative to each other. For example, the left roller unit 303a is positioned such that its longitudinal axis (which is generally perpendicular to the direction of movement V) is at a first distance D1 from the tow bar 302, while the middle roller unit 303b is positioned at a second distance D2 from the tow bar 302, with the second distance D2 being greater than the first distance D1. The right roller unit 303c, in accordance with this embodiment, is located at the first distance D1 from the tow bar 302 (similar to the first roller unit 303a). However, alternatively, the right roller unit 303c is positioned at a different distance from the tow bar 302 than either the left roller unit 303a or the middle roller unit 303b, with the different distance being shorter than the first distance D1 or longer than the second distance D2.

The roller units 303a-303c are further positioned such that ends of adjacent roller units are overlapping at least in part. For example, a right end of the left roller unit 303a is overlapping by a distance X1 with a left end of the middle roller unit 303b, and a left end of the right roller unit 303c is overlapping by a distance X2 with a right end of the middle roller unit 303b.

Similar to the embodiments described above in reference to FIGS. 1-10, the agricultural system 300 is movable in a direction V along a field 330 in which standing residual plant matter 332 forward of the roller units 303a-303c is leveled by the roller devices 314a-314c into crushed residual plant matter 334. One benefit of having the roller units in a shifted arrangement is that provides an agricultural system in which each roller unit can be attached and replaced independent of adjacent roller units. For example, if one of the roller units becomes defective, fixing or replacing that defective roller unit will have minimal or no impact on the other roller units. Another benefit of the shifted arrangement is that it eliminates or greatly reduces the likelihood that standing residual plant matter 332 may be left standing (and is not crushed) in an area between adjacent roller devices such as in areas corresponding to the distance X1 and the distance X2. According to the illustrated arrangement of FIGS. 11A-11C, the left roller device 314a crushes standing residual plant matter 332 along a left path 333a on the field 330, the middle roller device 314b crushes standing residual plant matter 332 along a middle path 333b on the field 330, and the right roller device 314c crushes standing residual plant matter 332 along a right path 333c on the field 330.

Referring to FIG. 12, an agricultural system 400 is similar to one or more of the embodiments described above in reference to FIGS. 1-11C and, further, includes a fertilizer injector 450 for inserting a fertilizer 452 into a furrow 454, and a fertilizer opener disk 460 for preparing, at least in part, the furrow 454 for receiving the fertilizer 452. The agricultural system 400 includes a pair of opener disks 410 for forming the furrow 454 into a field 430. The opener disks 410, which form the furrow 454, are attached to a frame 406 and are in a leading position relative to a roller device 414, which is generally aligned with and/or concentric with the fertilizer opener disk 460.

As the agricultural system 400 is moved along the field 430, the opener disks 410 form the furrow 454, the roller device 414 crushes standing residual plant matter in its path, and the fertilizer injector 450 deposits the fertilizer 452 into the furrow 454. One benefit of the agricultural system 400 is that the furrow 454 is formed, the residual plant matter is crushed, and the fertilizer is deposited in a single pass through the field 430, increasing efficiency and reducing expenses associated with the preparation of the field 430 for planting or other agricultural purposes.

Figure 13:
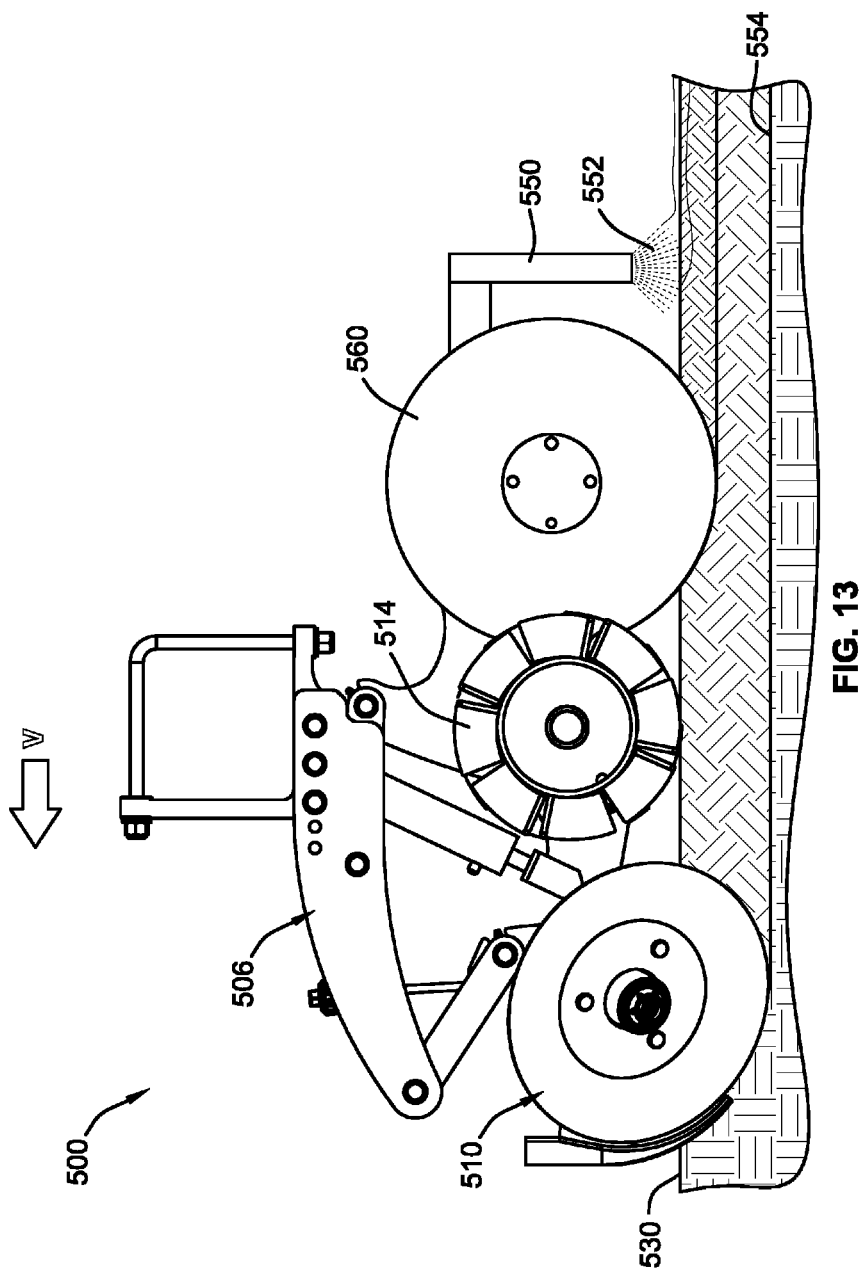
FIG. 13 is a side view of an agricultural system having a roller device with a fertilizer opener disk and a fertilizer injector.

Referring to FIG. 13, an agricultural system 500 is similar to one or more of the embodiments described above in reference to FIGS. 1-12 and, further, includes a fertilizer opener disk 560 for preparing a furrow 554 for receiving a fertilizer 552 inserted by a fertilizer injector 550. The agricultural system 500 includes a pair of leading opener disks 510 for forming, at least in part, the furrow 554 into a field 530. The leading opener disks 510 are attached to a frame 506 and are in a leading position relative to a roller device 514, which, in turn, is in a leading position relative to the fertilizer opener disk 560.

As the agricultural system 500 is moved along the field 530, the leading opener disks 510 form the furrow 554, at least in part, the roller device 514 crushes standing residual plant matter in its path, the fertilizer opener disk 560 prepares the furrow 554 for receiving the fertilizer 552, and the fertilizer injector 550 inserts the fertilizer 552 into the furrow 554. One benefit of the agricultural system 500 is that each of these agricultural operations is achieved during the same (single) pass through the filed 530 to increase operational efficiency.

It will be evident to those skilled in the art that the invention is not limited to the details of the foregoing illustrated embodiment and that the present invention may be embodied in other specific forms without departing from the spirit or essential attributes thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural system comprising:
a tow bar for attachment to a towing vehicle in a trailing position relative to a direction of movement along a field;
a first row-cleaning device attached via a first frame to the tow bar, the first row-cleaning device including at least one first furrow-opener disk and a first roller device, the first roller device being in a trailing position relative to the at least one first furrow-opener disk and having a first longitudinal axis perpendicular to a direction of movement V along the field, the first roller device being configured to crush standing residual plant matter along a first path on the field; and
a second row-cleaning device attached via a second frame to the tow bar, the second row-cleaning device including at least one second furrow-opener disk and a second roller device, the second roller device being in a trailing position relative to the at least one second furrow-opener disk and having a second longitudinal axis perpendicular to the direction of movement V along the field, the second longitudinal axis of the second roller device being offset from the first longitudinal axis of the first roller device, the second roller device being configured to crush standing residual plant matter along a second path on the field.

2. The agricultural system of claim 1, wherein the first longitudinal axis of the first roller device is at a first distance D1 from the tow bar and the second longitudinal axis of the second roller device is at a second distance D2 from the tow bar, the second distance D2 being greater than the first distance D1.

3. The agricultural system of claim 1, wherein adjacent ends of the first roller device and the second roller device overlap a distance X1.

4. The agricultural system of claim 1, wherein at least one of the first furrow-opener disk and the second furrow-opener disk is a forged blade with an induction hardened edge.

5. The agricultural system of claim 1, further comprising a third row-cleaning device attached via a third frame to the tow bar, the third row-cleaning device including at least one third furrow-opener disk and a third roller device, the third roller device being in a trailing position relative to the at least one third furrow-opener disk and having a third longitudinal axis perpendicular to the direction of movement V along the field, the second row-cleaning device being positioned longitudinally between the first row-cleaning device and the third row-cleaning device, the third roller device being configured to crush standing residual plant matter along a third path on the field.

6. The agricultural system of claim 5, wherein the third longitudinal axis of the third roller device is aligned with the first longitudinal axis of the first roller device.

7. The agricultural system of claim 5, wherein first longitudinal axis of the first roller device is at a first distance D1 from the tow bar and the second longitudinal axis of the second roller device is at a second distance D2 from the tow bar, the second distance D2 being greater than the first distance D1, the third longitudinal axis of the third roller device being at a different distance from the tow bar than either distance D1 or distance D2.

8. The agricultural system of claim 5, wherein adjacent ends of the second roller device and the third roller device overlap a distance X2.

9. The agricultural system of claim 1, further comprising a fertilizer injector mounted to at least one of the first row-cleaning device or the second row-cleaning device, the fertilizer injector trailing in part the respective one of the first roller device or the second roller device and being configured to deposit a fertilizer into a furrow formed by a respective one of the at least one first furrow-opener disk or the at least one second furrow-opener disk.

10. The agricultural system of claim 9, further comprising a fertilizer opener disk mounted to at least one of the first row-cleaning device or the second row-cleaning device, the fertilizer opener disk being in a trailing position relative to the respective one of the first roller device or the second roller device, the fertilizer opener disk being in a leading position relative to the fertilizer injector, the fertilizer opener disk being configured to prepare the furrow for receiving the fertilizer.

11. An agricultural system comprising:
a first row-cleaning unit having
a first frame configured for mounting to a tow bar,
at least one first furrow-opener disk attached to the first frame in a leading position and being configured to form a first furrow,
a first roller device attached to the first frame in a trailing position relative to the at least one first furrow-opener disk and being configured to crush standing residual plant matter along a first path in a field, the first roller device having a first longitudinal axis perpendicular to a direction of movement V along the field, and
a fertilizer injector attached to the first frame in a trailing position relative to the first roller device and being configured to deposit fertilizer into the first furrow; and
a second row-cleaning unit having
a second frame configured for mounting to a tow bar, at least one second furrow-opener disk attached to the second frame in a leading position and being configured to form a second furrow, a second roller device attached to the second frame in a trailing position relative to the at least one second furrow-opener disk and being configured to crush standing residual plant matter along a second path in a field, the second roller device having a second longitudinal axis perpendicular to a direction of movement V along the field, the second longitudinal axis of the first roller device being offset from the first longitudinal axis of the first roller device, and a fertilizer injector attached to the second frame in a trailing position relative to the second roller device and being configured to deposit fertilizer into the second furrow.

12. The agricultural system of claim 11, wherein the first longitudinal axis of the first roller device is at a first distance D1 from a position of the tow bar and the second longitudinal axis of the second roller device is at a second distance D2 from a position of the tow bar, the second distance D2 being greater than the first distance D1.

13. The agricultural system of claim 11, wherein adjacent ends of the first roller device and the second roller device overlap a distance X1.

14. The agricultural system of claim 11, wherein at least one of the first furrow-opener disk and the second furrow-opener disk is a forged blade with an induction hardened edge.

15. The agricultural system of claim 11, further comprising a fertilizer opener disk mounted to at least one of the first row-cleaning unit or the second row-cleaning unit, the fertilizer opener disk being in a trailing position relative to the respective one of the first roller device or the second roller device, the fertilizer opener disk being in a leading position relative to the fertilizer injector, the fertilizer opener disk being configured to prepare the furrow for receiving the fertilizer.

16. The agricultural system of claim 11, further comprising a fertilizer opener disk mounted to at least one of the first row-cleaning unit or the second row-cleaning unit, the fertilizer opener disk being aligned with the respective one of the first roller device or the second roller device.

* * * * *